(12) United States Patent
Nanbu et al.

(10) Patent No.: US 6,970,754 B1
(45) Date of Patent: Nov. 29, 2005

(54) SALES SUPPORTING APPARATUS

(75) Inventors: Masanori Nanbu, Kanagawa (JP); Toshio Tamura, Kanagawa (JP); Kohji Iwamoto, Kanagawa (JP); Yukio Fukui, Kanagawa (JP)

(73) Assignee: Amada Company Limited, Kanagawa (JP)

( * ) Notice: Subject to any disclaimer, the term of this patent is extended or adjusted under 35 U.S.C. 154(b) by 0 days.

(21) Appl. No.: 09/720,250

(22) PCT Filed: Jul. 14, 1999

(86) PCT No.: PCT/JP99/03802

§ 371 (c)(1),
(2), (4) Date: Jan. 8, 2001

(87) PCT Pub. No.: WO00/04471

PCT Pub. Date: Jan. 27, 2000

(30) Foreign Application Priority Data

Jul. 15, 1998 (JP) ............... P10-200995
Oct. 27, 1998 (JP) ............... P10-306057

(51) Int. Cl.[7] .......................................... G06F 19/00
(52) U.S. Cl. ........................................... 700/97; 703/1
(58) Field of Search ................. 700/97, 106, 107, 700/159, 165; 703/1, 7, 8; 706/919–920

(56) References Cited

U.S. PATENT DOCUMENTS

| | | | |
|---|---|---|---|
| 4,954,820 A | | 9/1990 | Kohno et al. |
| 5,377,116 A | * | 12/1994 | Wayne et al. ............... 700/175 |
| 5,488,470 A | * | 1/1996 | Ooenoki ..................... 356/138 |
| 5,680,317 A | * | 10/1997 | Watanabe .................... 703/1 |
| 5,731,982 A | * | 3/1998 | Namba et al. .............. 700/182 |
| 6,338,000 B1 | * | 1/2002 | Nakajima et al. ............ 700/97 |

FOREIGN PATENT DOCUMENTS

| | | |
|---|---|---|
| JP | 1-216746 | 8/1989 |
| JP | 5-165853 | 7/1993 |
| JP | 5-334316 | 12/1993 |
| JP | 6-44280 | 2/1994 |
| JP | 8-155560 | 6/1996 |
| JP | 9-136324 | 5/1997 |
| JP | 9-192755 | 7/1997 |

OTHER PUBLICATIONS

English Language Abstract of JP 5-334316.
English Language Abstract of JP 5-165853.
English Language Abstract of JP 9-192755.
English Language Abstract of JP 6-44280.

(Continued)

*Primary Examiner*—Leo Picard
*Assistant Examiner*—Zoila Cabrera
(74) *Attorney, Agent, or Firm*—Greenblum & Bernstein, P.L.C.

(57) ABSTRACT

The present invention is provided with an increase profit calculating apparatus (122) which simulates increase profit according to a commercial article proposal, an inferiority phenomena countermeasure guiding apparatus (123) which proposes a commercial article so as to solve a problem, a commercial article proposal supporting section (102) having a commercial article catalog output apparatus (121), a commercial article database (105) having shape/material quality/ commercial article data of product groups classified on the basis of pattern shapes of products, a product automatic designing apparatus (product parameter setting apparatus) (132) which designs a product corresponding to a product specification required using pattern shape data parametrically, a machining possibility calculating apparatus (133) which simulates whether or not a designed product is capable of being machined, an estimate creating section (103) having an estimate information output apparatus, and an order reception information creating apparatus (104).

6 Claims, 43 Drawing Sheets

OTHER PUBLICATIONS

English Language Abstract of JP 9-136324.
English Language Abstract of JP 8-155560.
Article by Mutou et al., published Dec. 1, 1990, vol. 5, No. 13, Industrial Daily News Co., Ltd..

English Language Translation of Article by Mutou, et al., published Dec. 1, 1999, vol. 5, No. 13, Industrial Daily News Co., Ltd.

* cited by examiner

| PROPOSAL FOR INCREASE PROFIT | |
|---|---|
| TRIPLE HOLDER | |
| SEMI-AUTOMATIC TRIPLE HOLDER | |
| (HOME) (MENU) | |

~207

TRIPLE HOLDER INCREASE PROFIT  ~207a (A) NUMBER OF HOLDER EXCHANGES PER ONE DAY? ~207b :  [10] TIMES ~207e
(B) HOLDER EXCHANGE TIME PER ONE EXCHANGE? : [15] MIN. ~207f
(C) LABOR COST OF WORKING PERSON PER ONE HOUR ? : [3000] YEN ~207g
                                        ~207c
(D) WORKING DAYS PER ONE MONTH? ~207d  : [22] DAYS ~207h

[CALCULATION]

LABOR COST REQUIRED FOR HOLDER EXCHANGE

● SINGLE HOLER

LABOR COST PER ONE HOUR × EXCHANGE TIME PER ONE × NUMBER OF EXCHANGES PER ONE DAY × WOKING DAYS PER ONE MONTH    = [165,000] YEN ~207i

● TRIPLE HOLDER

HOLDER EXCHANGE TIMES BECOMES 1/3 SINCE BECAUSE THREE DIES CAN BE MOUNTED ON TRIPLE HOLDER
LABOR COST PER ONE HOUR × EXCHANGE TIME PER ONE TIME × NUMBER OF ~207j EXCHANGES PER ONE DAY × 1/3 × WORKING DAYS PER ONE MONTH
                                                = [55,000] YEN

INCREASE PROFIT PER ONE MONTH = LABOR COST OF CONVENTIONAL SINGLE HOLDER − LABOR COST OF INTRODUCED TRIPLE HOLDER = [110,000]YEN
                                                                ~207k

[RETURN]

FIG.14

1V DIE COUNTERMEASURE COMMERCIAL ARTICLE

COMMERCIAL ARTICLE NAME : SELATIC DIE

FEATURE : LIGHT & INEXPENSIVE

PROPER MATERIAL QUALITY : STAINLESS STEEL, IRON, BONDERIZING THIN PLATE

ACCORDING TO SELECTION OF PICTURE, EXPLANATION IS DISPLAYED ON BLUE FRAME

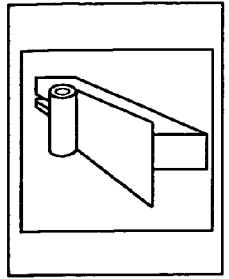
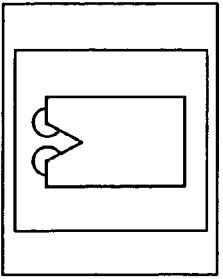
URETHANE SHEET

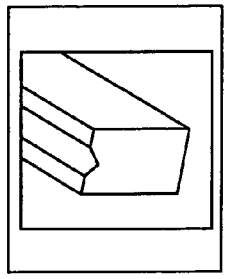
HARD PLATING
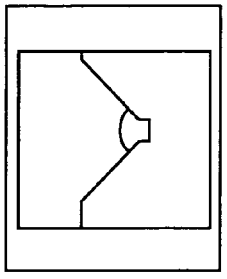

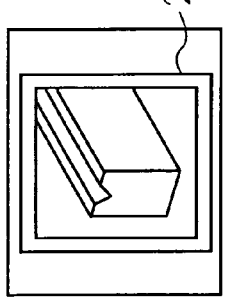
SELATIC DIE
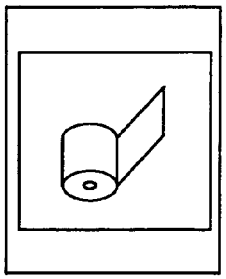

HOMEPAGE

VARIOUS PROBLEMS IN BENDING MACHINING

1V DIE COUNTERMEASURE COMMERCIAL ARTICLES

2V DIE COUNTERMEASURE COMMERCIAL ARTICLES

OTHER COUNTERMEASURE COMMERCIAL ARTILCES

PROPER V WIDTH & TON NUMER

FIG.23

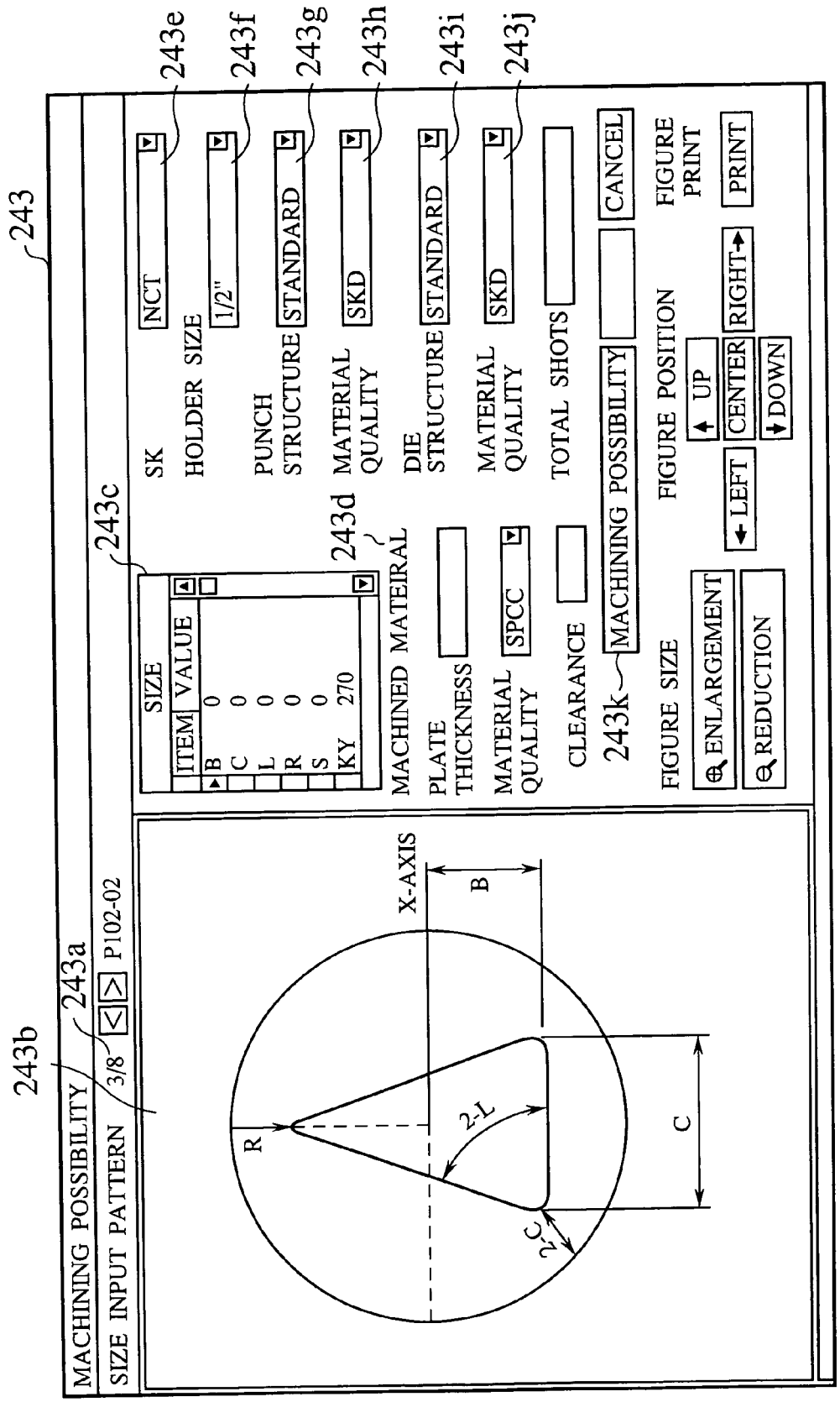

FIG.25

| ITEM | SIZE | VALUE |
|---|---|---|
| B | | 15 |
| C | | 15 |
| L | | 75 |
| R | | 1 |
| S | | 1 |
| KY | | 180 |

MACHINING POSSIBILITY  
SIZE INPUT PATTERN 3/8  P102-02

SK  NCT

HOLDER SIZE  2"

PUNCH STRUCTURE  STANDARD

MATERIAL QUALITY  SKD

DIE STRUCTURE  STANDARD

MATERIAL QUALITY  SKD

TOTAL SHOTS  1

MACHINED MATERIAL

PLATE THICKNESS  1

MATERIAL QUALITY  SPCC

CLEARANCE  0.15

MACHINING POSSIBILITY  SELECTION  CANCEL

FIGURE SIZE

ENLARGEMENT

REDUCTION

FIGURE POSITION

← LEFT  ↑ UP  CENTER  RIGHT →  ↓ DOWN

FIGURE PRINT  PRINT

*CAPABLE OF MACHINING 245, 245a, 245b, 245c, 245d, 245e, 245f, 245g

FIG.28

PARTS LIST — 251a — 1/1

NO. 453 TYPE (H90)

| No | COMMERCIAL ARTICLE NAME | UNIT PRICE | QUANTITY |
|---|---|---|---|
| 1 | 01 GOOSE PUNCH #453(L) | xxx,xxx | 1 |
|  | 01 GOOSE PUNCH #453(S) | xx,xxx |  |
|  | 01 GOOSE PUNCH #453(DIVISION) | xxx,xxx |  |

251b

251c  .2

○ NO TIP END R
⦿ TIP END R

251d
SPECIAL MENTION
SELECTION
CLOSE

251

DIVISION EAR SHAPE
30, 25, 10R, 10

120, 90, 6, 88 DEGREE

TIP END R : 0.2, 0.6, 0.8, 1.5, 3.0

FIG.32

| | | | ESTIMATE PARENT NO. | A700000 | [DELIVERY] (LIMITED COMPANY) A WORKS/ [CONTRACT] (LIMITED COMPANY) A WORKS | 259a | | ITEM FOR ORDER RECEPTION |
|---|---|---|---|---|---|---|---|---|

259b — ESTIMATE | ESTIMATE DETAILS

DISCOUNT RATE
○ APPLICATION
○ FIX  [  ]

☐ EXCESS APPLICATION
☐ SIMULTANEOUS TRIAL PUNCHING

☐ MAIL RESPONSE FOR PREPARED HOLE SIZE?
☑ STRIP AMOUNT DISPLAY?

☐ BLANKET DELIVERY
☐ CONFIRMATION FIGURE REQUIRED? [  ]

[ INPUT  10 ]
[ DELETE ]
[ COMMERCIAL ARTICLE SELECTION ]

| Seq | SK | Cat-No. | QUANTITY | SHAPE | COMMERCIAL ARTICLE NAME | A SIZE | B SIZE | CLEAR | CORNER R | DEDICATED KEY | ESTIMATE AMOUNT |
|---|---|---|---|---|---|---|---|---|---|---|---|
| 1 | 11 | 453021 | 1 | 000 | ONE TOUCH 88° GOOSE NECK | | | | | | xx,xxx |
| 2 | 11 | 45302E | 1 | 000 | No.453 TYPE OF ANGLE, R ADDITIONAL MACHINING | | | | | | xxx,xxx |

[ SIZE CONFIRMATION ]
[ COMMERCIAL ARTICLE RETRIEVAL ]
[ SEPARATE DIE  CLEAR ]

TOTAL AMOUNT  XXX,XXX   DISCOUNT AMOUNT  XX,XXX   ESTIMATE AMOUNT  XXX,XXX

259m

259f — COMMERCIAL ARTICLE NAME : No.453 TYPE OF ANGLE, R ADDITIONAL MACHINING (B4530KT)
259g — UNIT PRICE  XXX,XXX    PRICE  XXX,XXX
259h — REFERENCE DELIVERY TIME  5    DELIVERABLE DAY  1998/06/30
        MARKING No. [  ]    CUSTOMER REQUEST DAY  / /
259k — DISCOUNT RATE  10(%)   DISCOUNT AMOUNT  xx,xxx

SPECIAL MENTION ITEM

| SEQ | SPECIAL MENTION ITEM | VALUE |
|---|---|---|

259p  259i
259l  259j 259c
259n — [ CALCULATION ]
259o — [ ESTIMATE ISSUE ]

[ ORDER RECEPTION DECISION ]
[ ORDER ACKNOWLEDGMENT ]
☐ FAX

| | | | | | COMMERCIAL | | A | B | | CORNER | DEDICATED | ESTIMATE |
| Seq | SK | Cat-No. | QUANTITY | SHAPE | ARTICLE NAME | | SIZE | SIZE | CLEAR | R | KEY | AMOUNT |
|---|---|---|---|---|---|---|---|---|---|---|---|---|
| 1 | 10 | 004021 | 1 | 000 | 88° PUNCH 0.2RL | | | | | | | XX,XXX |
| 2 | 11 | 322040 | 1 | 002 | 1 1/4"OH SHAPE | | 20 | 20 | | 2 | | XXX,XXX |

ESTIMATE PARENT NO. [ ]  [DELIVERY] (LIMITED COMPANY) A WORKS/ — 261a
[CONTRACT] (LIMITED COMPANY) A WORKS

ESTIMATE | ESTIMATE DETAILS

☐ EXCESS APPLICATION   ☐ MAIL RESPONSE FOR   ☐ BLANKET DELIVERY
☐ SIMULTANEOUS             PREPARED HOLE SIZE?   ☐ CONFIRMATION
    TRIAL PUNCHING        ☒ STRIP AMOUNT DISPLAY?        FIGURE REQUIRED?

261b

TOTAL AMOUNT  XXX,XXX   DISCOUNT AMOUNT  XX,XXX   ESTIMATE AMOUNT  XXX,XXX

COMMERCIAL ARTICLE NAME  88° PUNCH 0.2RL

UNIT PRICE  XX,XXX   PRICE  XX,XXX                    SPECIAL MENTION ITEM
REFERENCE              DELIVERABLE  1998/06/30         | SEQ | SPECIAL MENTION ITEM | VALUE |
DELIVERY TIME  1—261c   DAY                            |---|---|---|
                       CUSTOMER                         
MARKING No.            REQUEST DAY  /                   261d
                       DISCOUNT
DISCOUNT RATE 10(%)    AMOUNT  XX,XXX                  261i

261

ITEM FOR ORDER RECEPTION

[ INPUT ] 10
[ DELETE ]
[ CANCEL ]
[ COMMERCIAL ARTICLE SELECTION ]
[ SIZE CONFIRMATION ]
[ COMMERCIAL ARTICLE RETRIEVAL ]
[ PAST SALES ]
[ SEPARATE DIE ]
[ CLEAR ] ☐
[ CALCULATION ] — 261e
[ ] — 261f
[ ESTIMATE ISSUE ]
[ ORDER RECEPTION DECISION ] — 261g
[ ORDER ACKNOWLEDGMENT ] — 261h
☐ FAX

FIG.34

ESTIMATE ~263

JUNE 23, 1998            PAGE 1

No. A700000

LIMITED COMPANY A WORKS

REGARDING YOUR INQUERY OF NO.XXXXX DATED JUNE 23, WE ESTIMATE THIS CASE AS FOLLOWS, THEREFORE PLEASE LET US HAVE YOUR ORDER REGARDING THIS CASE.

263a — DELIVERY TIME    AS FOLLOWS
263b — DELIVERY PLACE    YOUR DESIGNATED PLACE    TEL
263c — PAYMENT CONDITION    AS USUAL    FAX
263d — DELIVERY CONDITION    DELIVERY
263e — EFFECTIVE TERM OF ESTIMATE

263f

| TOTAL AMOUNT | ¥ 221,580— | | | | |
|---|---|---|---|---|---|
| ITEM | ARTICLE NAME SPEC. | QUANTITY | UNIT PRICE | AMOUNT | DELIVERY TIME |
| A700045-001 | ONE TOUCH 88° GOOSE NECK 0.2R L No.:453021 | 1 | XXX,XXX | XXX,XXX | |
| A700045-002 | ONE TOUCH No.453 TYPE OF ANGLE R ADDITIONAL MACHINIG (B4530KT) | 1 | XXX,XXX | XXX,XXX | |
| | | 1 | TOTAL AMOUNT | XXX,XXX | |
| | | | YOUR DISCOUNT | XX,XXX | |
| | | | PROPOSED PRICE | XXX,XXX | |
| | —BLANK BELOW— | | | | |
| | | | | | |
| | | | | | |
| | | | | | |

263g   263h      263i

SALES SUPPORTING APPARATUS

TECHNICAL FIELD

The present invention relates to a marketing supporting system. In particular, to a technical field for performing an efficient product proposal, and for implementing instantaneous answer of estimation to various product requirements and order reception input in a marketing place.

BACKGROUND ART

Conventionally, marketing of a product such as a die for machining is performed through marketing activities in which a sales person visits a working factory or the like to conduct business activity, which is so-called door-to-door selling style.

In the door-to-door selling, when such a product as a die is proposed to a customer, a sales person merely selects a product(s) from many products through paper catalogs to explain the product(s) therethrough.

Also, when a die required by a customer is a die with a special shape which is not a standard die, the sales person brings a die specification drawn on such a sheet as a paper which is required by the customer back to a design department of his/her company. In this design department, design and check of drawings (verification about whether or not the special die can be manufactured) are conducted and the result is notified to the sales person. The sales person prepares an estimate for the die on the basis of the result and visits the customer again to present the estimate and receive an order of the product. The information about this order reception is input into a database in a head office of the company to issue an instruction to a manufacturing department after he/she comes back to his/her sales station or the like.

In such a process, however, there is a drawback that a product(s) cannot be presented to a customer(s) efficiently. Also, there is another drawback that, when a sales person is asked by a customer, he/she cannot answer the question efficiently.

Furthermore, when a die with a special shape (hereinafter, called special die) is ordered, such an order is brought back to the company and a design and check of drawings are conducted in the design department. For this reason, there is still another drawback that an estimate including an appointed data of delivery cannot be presented to the customer immediately, which results in that a long time is required from an order reception to delivery.

Simultaneously, since a sales person brings back a specification of a special die based upon a handwriting indication, an oral indication or the like to give a person(s) in the design department the specification, there often occurs an error of an original instruction of a customer or misunderstanding of the sales person. For this reason, there occurs claims from customers because manufactured products do not meet specifications.

DISCLOSURE OF INVENTION

The present invention has been made in order to solve the above problems in the conventional art.

An object of the present invention is to present a product to a customer efficiently and in a various manner.

Also, another object of the present invention is to answer a customer's question to a product instantaneously and allow sales or marketing activities in a uniform level.

Furthermore, still another object of the present invention is to determine whether a standard product requested can be manufactured and whether or not a special shaped product requested can be machined in a door-to-door selling place.

Moreover, another object of the present invention is to allow instantaneous estimation and order reception input in a door-to-door selling place.

The summary of a marketing supporting system according to the present invention for solving the above problems is as follows:

One feature of the present invention is to provide an increase profit calculating apparatus which can grasp cost consumption easily and can grasp cost reduction easily and rapidly.

The increase profit calculating apparatus comprises:
first die screen creating means which creates a first die apparatus screen (205) for displaying a first die apparatus; and
increase profit screen creating means which is operated in response to a click operation of a specific mark on the first die apparatus screen and which creates an increase profit screen (207) for displaying increase profit occurring by employing the first die apparatus instead of a second die apparatus corresponding to the first die apparatus.

The increase profit screen comprises:
question item fields (207a–207d) on which a plurality of questions about operations of the first die apparatus and the second die apparatus and relating to costs following the operations are presented;
a field (207i) on which a first total cost is displayed within a predetermined time period due to use of the first die apparatus;
a field (207j) on which a second total cost is displayed within the predetermined time period due to use of the second die apparatus; and
a field (207k) on which an increase profit field for displaying increase profit obtained by employing the first die apparatus is displayed.

Then, the increase profit calculating apparatus is provided with calculating means which calculates the first and second costs and the increase profit according to an answer to the questions from an operator.

According to the above configuration, cost consumption can be grasped easily and cost reduction can be grasped easily and rapidly.

It is preferable that the question items in the increase profit screen (207) includes the number of die apparatus exchanges per one day, a time required for die apparatus exchange per one time, personnel expenses per predetermined time, and the number of working days within a predetermined term.

A second feature of the present invention is to provide a inferiority phenomenon countermeasure guiding apparatus which allows search and selection of an optimal countermeasure to a inferiority phenomenon. The inferiority phenomenon countermeasure guiding apparatus comprises:
inferiority phenomenon screen creating means which creates a inferiority phenomenon screen (209) for displaying a plurality of inferiority phenomena in predetermined kinds of workings such as punching or the like; and
inferiority phenomenon cause screen creating means which is actuated by clicking a inferiority phenomenon display portion in the inferiority phenomenon screen and which creates a inferiority phenomenon cause screen (211) for displaying a list of causes (such as fatigue of a spring, a clearance unsuitableness and the like) causing the inferiority phenomenon.

It is preferable that the inferiority phenomenon countermeasure guiding apparatus further comprises avoidance information screen creating means which is actuated by clicking a portion displaying one cause in the list of causes and which creates an avoidance information screen (213) for displaying information for avoiding the one cause.

It is preferable that the inferiority phenomenon countermeasure guiding apparatus comprises specific die screen creating means which is actuated by clicking a predetermined portion of the inferiority phenomenon cause screen (211) or a predetermined portion of the avoidance information screen (213) and which creates a specific die screen (217) for displaying a specific die for avoiding the inferiority phenomenon.

According to these structures, it is made possible to search for and select an optimal countermeasure to an inferiority phenomenon easily.

Another feature of the present invention is to provide a inferiority phenomenon countermeasure guiding apparatus for a die for bending machining. This apparatus comprises cause/countermeasure display screen creating means which creates a cause/countermeasure screen (223) for displaying a cause of a inferiority phenomenon in a predetermined kind of workpiece such as bending workpiece or the like and a plurality of countermeasures of a first type for avoiding the inferiority phenomenon due to the cause; and countermeasure explanation screen creating means which is actuated by clicking a portion displaying one countermeasure in the cause/countermeasure screen and which creates a countermeasure explanation screen (225) for explaining specific contents of the countermeasure through a drawing(s) and a character(s).

This inferiority phenomenon countermeasure guiding apparatus further comprises specific die screen creating means which is actuated by clicking a predetermined portion of the cause/countermeasure screen or the countermeasure explanation screen and which creates a specific bending die screen (227) for displaying a specific bending die for avoiding the inferiority phenomenon due to the cause.

According to the above structure, it is made possible to select an optimal bending die rapidly when an inferiority phenomenon has occurred in a bending machining.

Another feature of the present invention is to provide a question answer accumulating apparatus comprising means for inputting a question;
means for inputting an answer to the question; and
means for storing the question and the answer in a state mutually correlated with each other.

According to this apparatus, machine operators' questions about dies or the like and answers thereto are accumulated so that knowledge of practically skilled persons responding to the answers are accumulated in a state correlated with the answers and it is possible to respond to a question which will occurs in the future easily.

Another feature of the present invention can provide a die retrieval apparatus comprising input screen creating means which creates input screens (231, 233) provided with a field in which a plurality of shapes of a die is input, a field in which the kind of a machine used with the die is input, a field in which a structure of the die is input, and a field in which material for the die is input; and standard die screen creating means which is actuated by inputting data pieces into the respective fields of the input screens and which, when a die meeting the respective data pieces exists, creates a standard die screen (235) for displaying a sectional configuration of the die, a parts list name, unit prices of respective parts, and, when no die meeting the respective data pieces exists, creates an error display.

According to this apparatus, it is made possible to select a die rapidly by inputting intuitive data pieces such as a die adaptive machine, a die shape or the like when a die is specified by combination of complicated symbols and when it is difficult to describe the combination of the symbols.

Another feature of the present invention is to provide a product automatic designing apparatus (product parameters setting apparatus) which is made possible to perform automatic designing of a die product at a door-to-door selling place or the like easily in answer to even a requirement for a product except for standard products. This product automatic designing apparatus (product parameters setting apparatus) can design a product shape on the basis of shape/material data of a group of products which have been classified and registered based upon the shape patterns of products in response to an estimate requirement for not only standard products on a product catalog but also specially shaped die products which cannot be substituted for standard products. That is, a die product can be designed parametrically by a simple operation of inputting predetermined size data regarding a selected shape pattern.

The structure for implementing this feature is, for example, a product automatic designing apparatus (product parameters setting apparatus) which comprises die shape selection screen creating means which creates shape pattern selection screens (237, 239) used for selection of a shape about a die to be designed, and die dimension parameter input screen creating means which is actuated according to selection and input of a specific shape pattern on the die shape selection screen and which creates a die dimension parameter input screen (241) which allows input of dimension parameters of predetermined portions about the selected die shape, wherein the shape pattern selection screen (237) includes at least a field which allows selection of the kind of a die to be designed and a field which allows selection of a shape pattern regarding the die to be designed;

the die dimension parameter input screen (241) includes at least a shape parameter input field (241b) which displays a dimension parameter input portion required to specify the selected die shape pattern and the shape of the die to be designed and a dimension parameter input field (241c) in which a dimension parameter of the input portion is input; and the product automatic designing apparatus (product parameter designing apparatus) comprises design means which performs a design according to a correspondence relationship between die shapes which have been classified on the basis of die shape patterns and stored previously and dimension parameter groups required to specify the shape of the die.

Incidentally, it is preferable that the previously stored shape pattern is stored so as to correspond to a plurality of dimension parameter groups required to specify the die shape belonging to the shape pattern, and the dimension input screen is further provided with a dimension input pattern selection field which allows selection of one dimension parameter group from the plurality of dimension parameter groups.

Also, it is preferable that the shape pattern selection screen further comprises adapted shape display field which displays one or a plurality of shape sub-patterns contained in shape variation included in the selected shape pattern.

According to this structure, a sales person can design a special shape die parametrically at a door-to-door selling place without such a consciousness that this die is a special shape die. Accordingly, he/she can design the special shape die at the door-to-door selling place without bringing a customer's requirement back to the design department.

Another feature of the present invention is to provide a machining possibility calculating apparatus which allows verification of possibility of real machining about the designed die product rapidly and easily.

This machining possibility calculating apparatus verifies whether or not a desired machining can be performed on the designed die product on the basis of shape data/material data about the designed product, material quality data of material to be machined, and the like. Also, the apparatus checks consistency among input dimension parameters.

The structure realizing this feature comprises, for example, die data input means which inputs die data including shape data of a predetermined die specified by the shape pattern and the dimension pattern of a die to be designed, structure data of the die and material quality data;

material data input means which inputs material data including the plate thickness and material quality of a material to be machined which is machined by the die; and machining verification means which verifies whether or not the die to be designed can be machined on the basis of the input die data and material data.

Incidentally, it is preferable that the machining verification means performs the verification by comparing the resisting pressure of the die which has been obtained according to a strength calculation from the die data and the machining request pressure required for machining performed by the die which has been obtained from the material data with each other.

Furthermore, it is preferable that the machining verification means performs the verification by checking the consistency among the input dimension data pieces.

According to this structure, since suitability about numerical values of the dimension parameters is checked, a determination about whether or not it is possible to manufacture the designed product actually, namely it is possible to provide the same, can be made instantaneously during a marketing activity. Accordingly, the number of work steps such as preparation of drawing checking, redesigning or the like is reduced.

Another feature of the present invention is to provide an automatic estimate creating apparatus which provides an estimate about the designed and verified product instantaneously at a marketing place.

The automatic estimate creating apparatus which creates an estimate including data necessary to create an estimate of not only price data of a product which has been designed/verified but also price reduction limitation and delivery time limit data.

The structure realizing this feature comprises input means which inputs product data of a product for which an estimate is to be prepared, the number of products, and customer data;

estimate data storage means in which delivery time limit data corresponding to the product and data about price reduction rate to a fixed price of a die product is stored; and detailed estimate information creating means which outputs detailed estimate information on the basis of the input data, wherein the detailed estimate information output includes deliverable data determined according to the delivery time limit data and an amount obtained by discount according to the discount rate data.

Incidentally, it is preferable that the product for which the estimate is to be created can be input by specifying the shape and/or material quality of the product.

According to the structure, since product data is displayed in a interlocking manner with design data specified from the shape or the like, it becomes unnecessary to perform complicated search/re-input from a large number of product codes, catalog numbers or the like. Also, it becomes possible to create an estimate including all information necessary for estimate rapidly and easily. Accordingly, an estimate is created instantly at a marketing place so that an early sales commitment can be obtained.

Another feature of the present invention is to provide an order reception information outputting apparatus which allows an instant order reception regarding the estimated product to issue a production instruction.

This order reception information outputting apparatus can secure an order reception to issue a manufacture instruction while presenting the contents of an estimate to a customer at a marketing place, and can make a communication with manufacture schedule information a remote place to output a deliverable data according to the manufacture schedule at this time.

The structure realizing this feature comprises, for example, order reception information screen creating means which displays an order reception information screen of a product ordered at a marketing place; and order reception information transmitting means which is actuated by clicking a specific mark on the order reception information screen and which transmits the order reception information to a manufacture end.

Incidentally, in addition, it is preferable that the order reception information outputting apparatus further comprises delivery data update displaying means which displays change in delivery data of a product on the order reception information screen on the basis of data received in response to transmission of the order reception information.

According to this structure, it is possible to secure an order reception rapidly and start manufacture at an early time. Accordingly, an early delivery of a product is made possible.

Incidentally, in the specification of the present application, the term "sale object" includes products such as a die apparatus, a machine part, a blade of a machine, a machine or the like, and services such as maintenance of these products.

BRIEF DESCRIPTION OF DRAWINGS

FIG. 3 is one example of a product catalog screen displayed on the display apparatus;

FIG. 4 is one example of an increase profit screen displaying increase profit displayed on the display screen;

FIG. 14 is a bending die display screen (special bending die screen) which is displayed by clicking a predetermined portion on the screen in FIG. 12 or FIG. 13, for explaining a countermeasure bending die (or novel bending die);

FIG. 15 is a special bending die detail explanatory screen which is displayed by clicking a predetermined portion on the screen in FIG. 14, for explaining the details of suitable material for the countermeasure bending die (novel bending die), a suitable apparatus, functions and the like;

FIG. 23 is an explanatory diagram of a dimension parameter input screen displayed in response to selection of the shape pattern of the punching die in FIG. 20 and FIG. 21;

FIG. 24 is an explanatory diagram of a dimension parameter input screen displayed when another dimension parameter group is selected in FIG. 22;

FIG. 25 is an explanatory diagram of a screen showing the result of machining possibility simulation for a punching die manufactured according to input dimension parameters, material and material quality in FIG. 23;

FIG. 28 is an explanatory diagram of a dimension parameter input screen displayed in response to shape pattern selection for a bending die in FIG. 26;

FIG. 32 is an explanatory diagram of an estimate detail information input screen displayed in response to a die product selection on the parts list screen;

FIG. 33 is an explanatory diagram of an estimate detail information input screen displayed in response to another die product selection on the parts list screen;

FIG. 34 is an explanatory diagram of an example of an estimate output in response to selection of estimate issue on the screen in FIG. 31;

BEST MODE FOR CARRYING OUT THE INVENTION

An embodiment of the present invention will be explained below with reference to the drawings.

Figure 1:
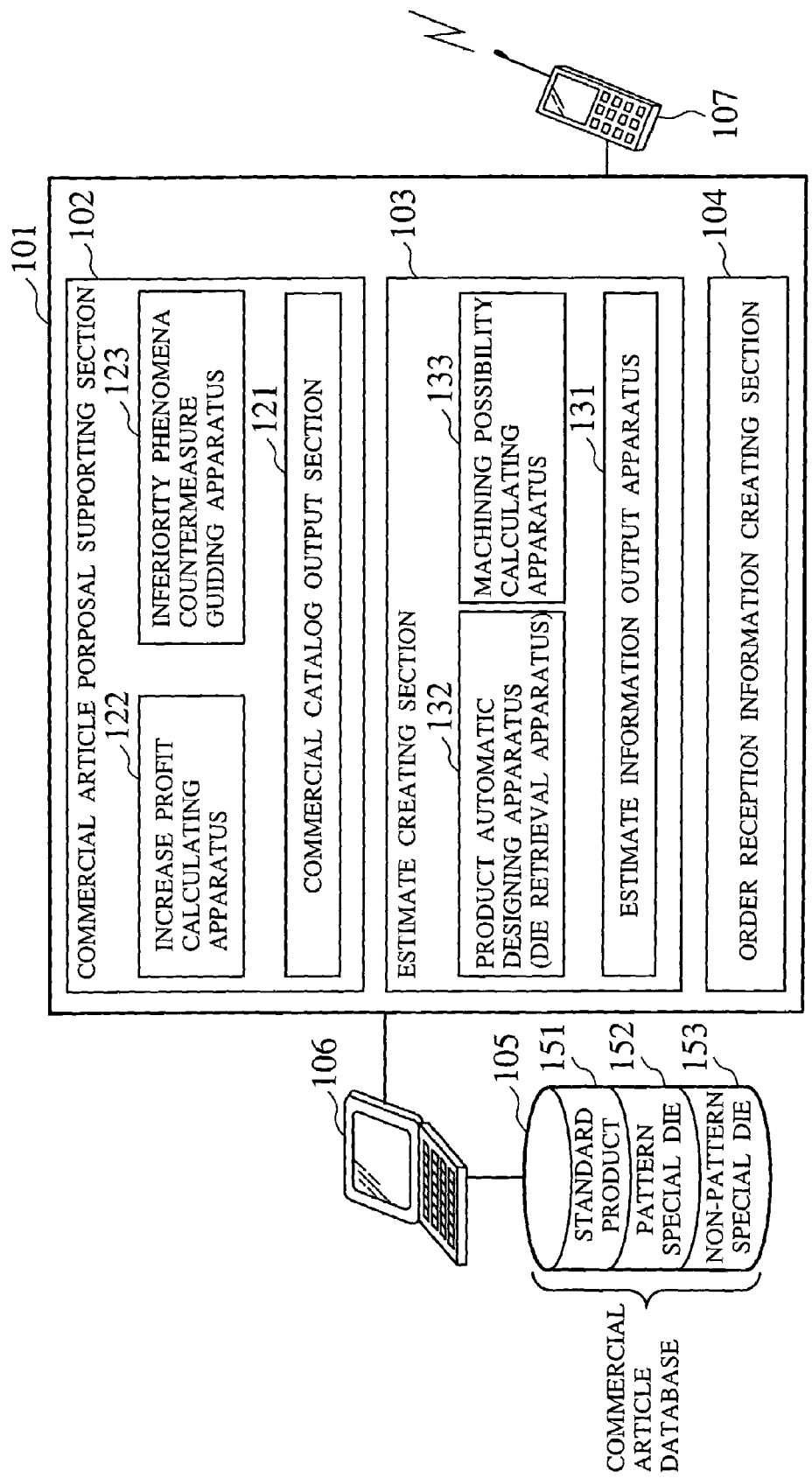
FIG. 1 is a block diagram showing a configuration of a supporting apparatus of the present invention.

Referring to FIG. 1, an embodiment of a marketing supporting apparatus of the present 1 1 invention comprises a database 105 in which data is stored, a display apparatus 106, and a communication apparatus 107 performing communication of data with an external apparatus. A marketing supporting apparatus 101 comprises a product proposal supporting section 102, an estimate creating section 103, and an order reception information creating apparatus 104. Then, the product proposal supporting section 102 comprises an increase profit calculation apparatus 122, an inferiority phenomenon countermeasure guiding apparatus 123, and a product catalog output apparatus 121. Also, the estimate creating section 103 comprises a product automatic designing apparatus (product parameter setting apparatus) (die retrieval apparatus) 132, a machining possibility calculation apparatus 133, and an estimate information output apparatus 131. Also, the product database 105 comprises a standard product database 105 in which data about standard dies is stored, a pattern special die database 152 in which special dies patterned are stored, and a non-patterned special die database 153 in which extremely special dies which cannot be patterned are stored.

For the marketing supporting apparatus 101 in the present embodiment, a program performing processing explained below is created and a computer system which can execute this processing by loading this created program is used. This computer system includes a so-called general purpose machine, a workstation, a PC, a NC (Network Computer) or the like. In the present invention, however, it is preferable that a portable type PC which can be carried to a marketing place. The hardware configuration of the computer system used in the present embodiment is provided with a CPU for performing various processings, a memory such as a program memory/data memory or the like, an external storage apparatus such as a FD, a CD or the like, and an output apparatus such as a display unit or the like. The processings explained below can be performed as off-line processings in a single PC without connection to a computer in a head office or a branch office except for processings which are performed in the order reception information creating apparatus 104.

Incidentally, the program for implementing the marketing supporting apparatus of the present embodiment is can be saved in one of various recording media such as a magnetic disk, an optical disk, a memory card and the like. The present embodiment can be implemented by reading recording medium into the program memory to execute the program.

Next, processing contents of the marketing supporting apparatus according to the embodiment of the present invention will be explained.

Figure 2:
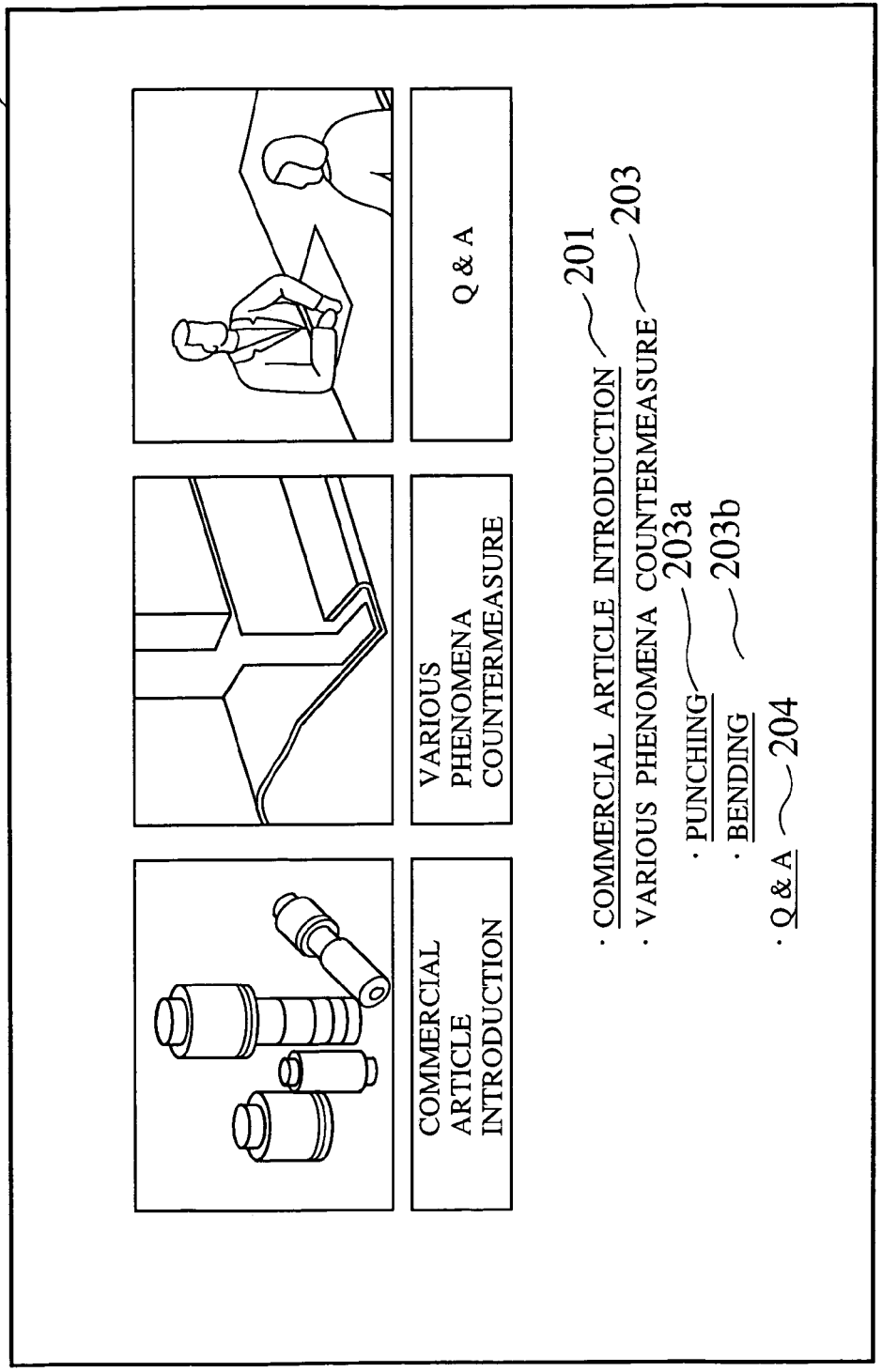
FIG. 2 is an explanatory diagram of a table of contents screen displayed on a display screen of the supporting apparatus of the present invention.

When the supporting apparatus is actuated, a contents table screen 200 shown in FIG. 2 is displayed on the display apparatus 106 (hereinafter, a case that the term "displayed" is merely used means that "display" is performed on the display apparatus 106 when there is no special explanation). Displayed on this contents table screen are a product introduction field 201, a various phenomena countermeasure (namely, inferiority phenomena countermeasure) field 203, and a question answer field 204. Incidentally, sub-fields of a punching field 203a and a bending (curving) field 203b are displayed on the various phenomena countermeasure field 203.

Figure 3:
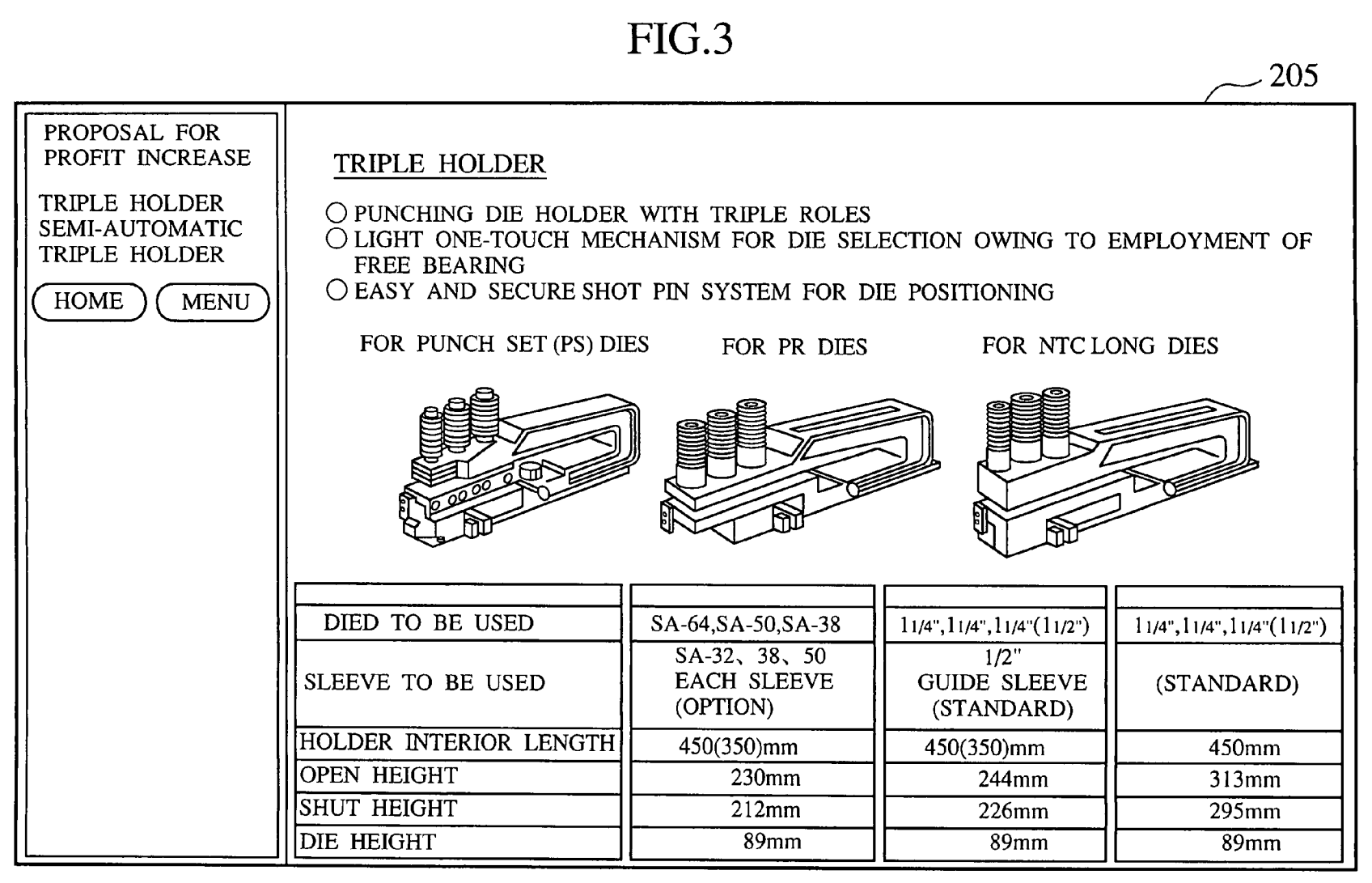

In the above, for example, when a display portion of the product introduction field 201 is clicked, the product catalog output apparatus 121 is actuated, and a product introduction screen 205 (a first die apparatus screen) as shown in FIG. 3 is displayed. In FIG. 3, as one example, triple holders holding three dies are displayed. According to this holder, once the holder is set on a punch press, punching machining of three kinds corresponding to the three dies mounted on the holder can be performed without exchanging dies.

According to the supporting apparatus of this invention, increase profit obtained by using the triple holder can easily be calculated. That is, when a predetermined portion on the display screen 205 in FIG. 3 is clicked, an increase profit screen 207 displayed in FIG. 4 is displayed. The increase profit screen 207 displays increase profit occurring by employing a triple holder instead of a single holder holding only one die. That is, displayed on this screen 207 are a question 207a for asking the number of holder exchanges per day, a question 207b for asking an exchanging time required per one time, a question 207c for asking labor cost of a worker per one hour, and a question 207 for asking working days per one month. Answer fields 207e, 207f, 207g and 207h in which an operator inputs answers to these questions are provided. That is, the field 207e in which an answer to the question 207a is input, the field 207f in which an answer to the question 207b is input, the field 207g in which an answer to the question 207c is input, and the field 207h in which an answer to the question 207d are provided. Then, when an operator writes answers in these fields, a labor cost (one month) required for holder exchanges occurring when a single holder is used is displayed on a field 207i, a labor cost per one month corresponding to a case of use of a triple holder is displayed on a field 207j, and increase profit per one month occurring when a triple holder is used instead of a single holder is displayed on a field 207k.

According to the invention, regarding to the triple holder (the first die apparatus), increase of profit obtained by the use of the triple holder instead of the single holder is calculated easily. In other words, the cost waste made by the use of the single holder (the second die apparatus) is grasped easily, and so is the cost reduction by the use of the triple holder (the first die apparatus).

Figure 5:
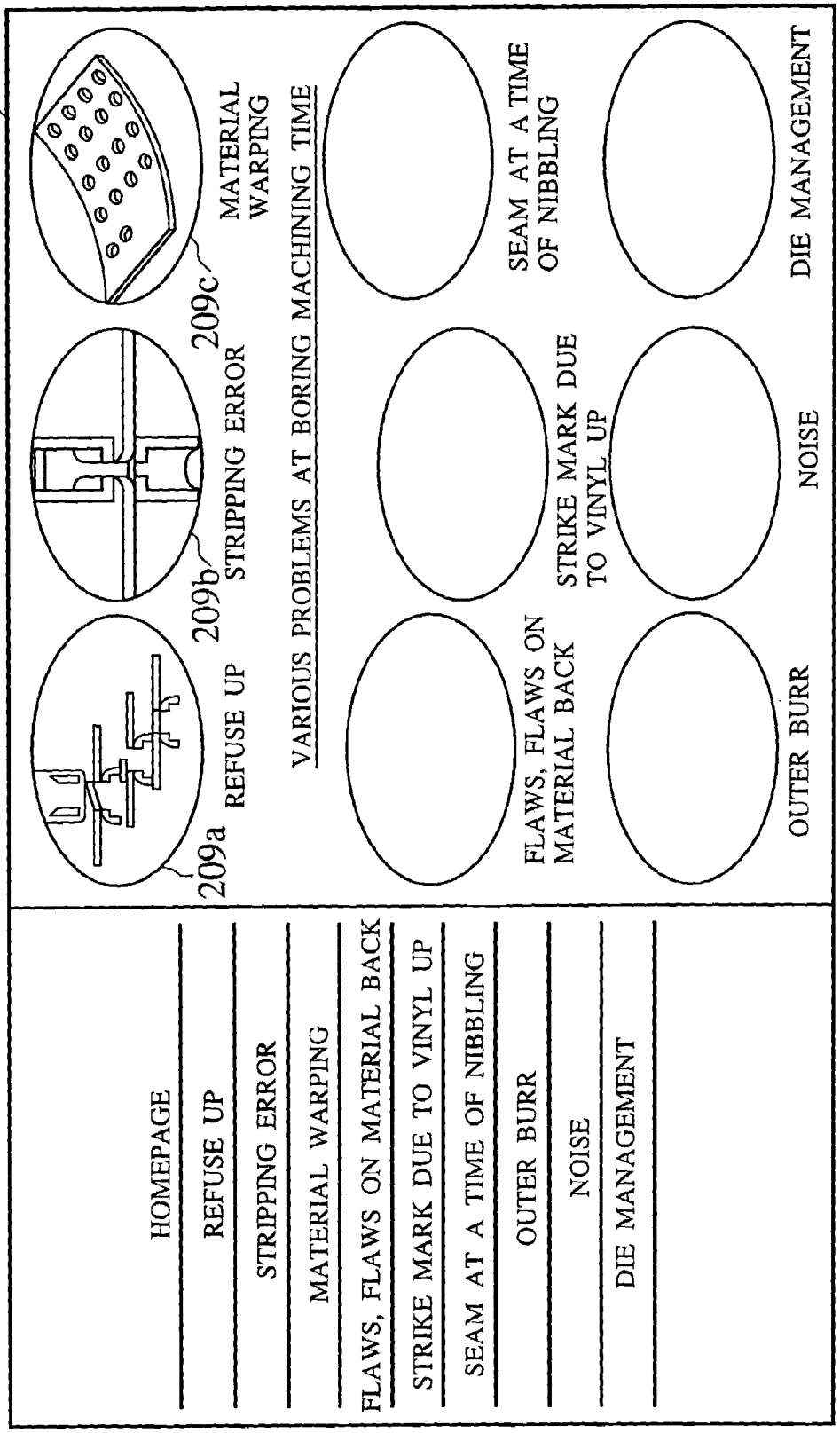
FIG. 5 is one example of an inferiority phenomenon screen displayed on the displaying apparatus.
Figure 6:
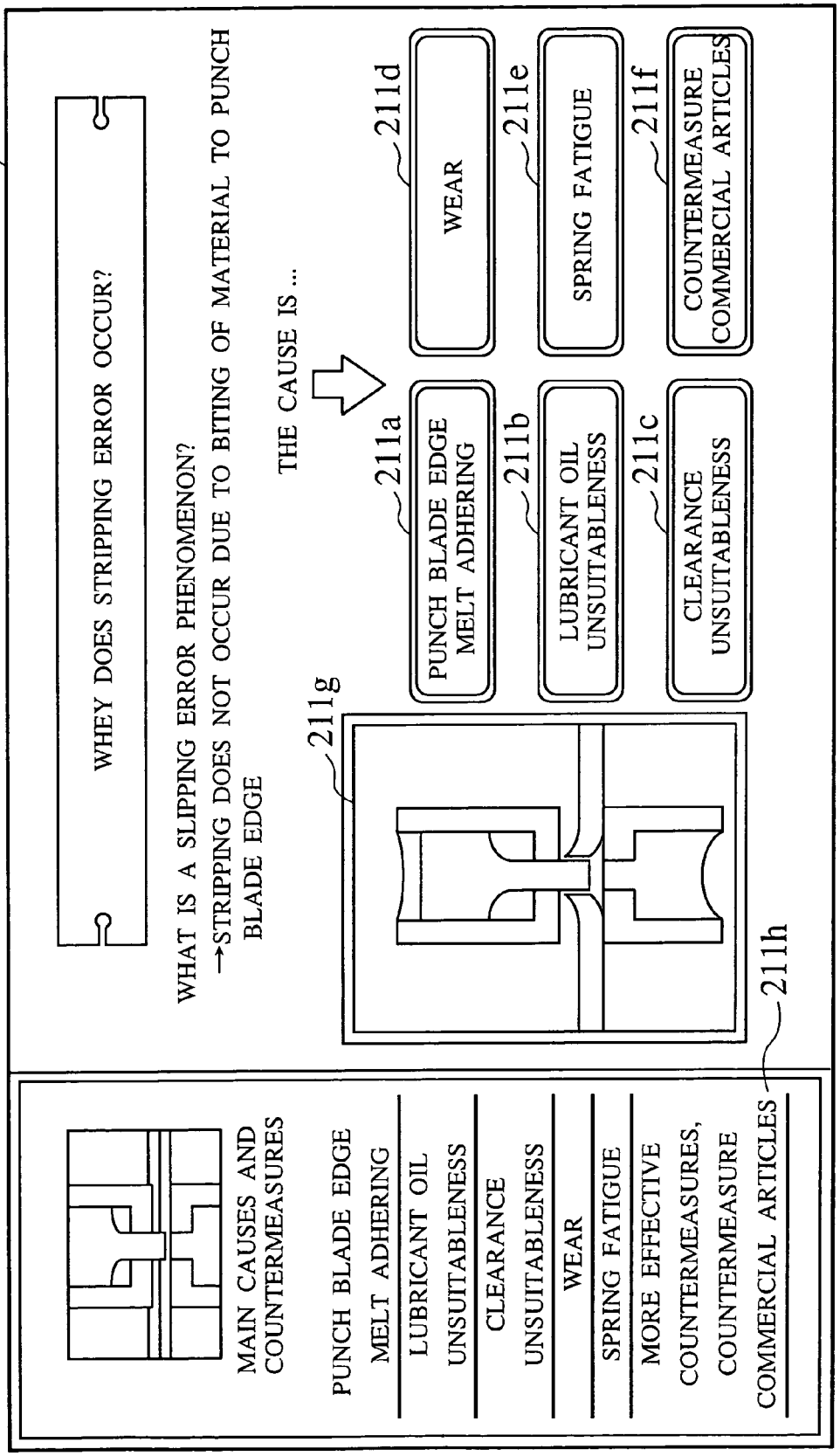
FIG. 6 is one example of a inferiority phenomenon cause screen displaying a list of causes generating an inferiority phenomenon shown in FIG. 5.

Next, when a field of the punching 203a in the various phenomena countermeasures 203 is clicked on the contents table screen 200 shown in FIG. 2, the various phenomena countermeasure guiding apparatus (inferiority phenomena countermeasure guiding apparatus) 123 is actuated and an inferiority phenomena screen 209 shown in FIG. 5 is displayed on the display apparatus 106. Images 209a, 209b, 209c and the like displaying various inferiority phenomena in a punching machining are displayed on the screen 209. Then, for example, when a display portion of a stripping error 209b is clicked on the screen 209, the inferiority phenomena cause screen creating means is actuated, and an inferiority phenomena cause screen 211 displaying a plurality of causes generating the stripping error (inferiority phenomenon) is displayed on the display apparatus 106 (FIG. 6). Incidentally, the stripping error means that a workpiece bites a tip portion of a punch which has performed punching machining and a portion of the workpiece which has been subjected to the punching machining is brought up according to elevation of the tip portion of the punch.

As shown in FIG. 6, punch blade tip melt adhesion 211a, lubricant unsuitableness 221b, clearance unsuitableness 211c, wear 211d, spring fatigue 211e and the like which may be causes of the stripping error are displayed on the screen 211. Also, a simulation displaying a situation where the stripping error occurs as an animation together with the plurality of causes 211a to 211e is displayed on a simulation display section 211g.

Accordingly, a drawback which has occurred in the material to be machined can easily be grasped and understood as a stripping error in punching machining by referring to this simulation screen. Also, since the causes of the stripping error are listed up on the screen 211, the cause of the inferiority phenomenon can easily be grasped and understood by referring to the list and a countermeasure to the inferiority phenomenon can be proposed.

Figure 7:
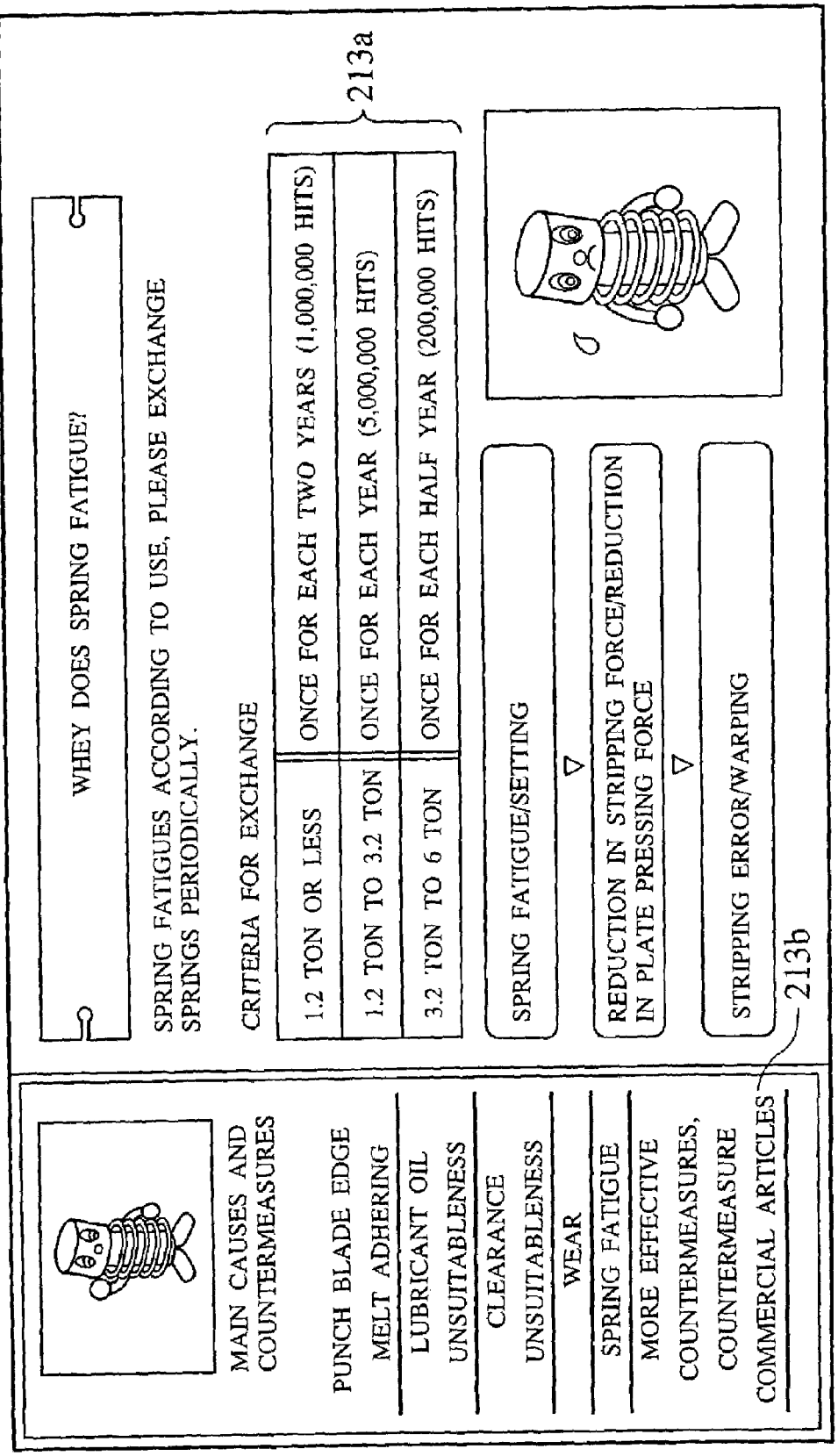
FIG. 7 is one example of an avoidance information screen displaying information for avoiding inferiority causes shown in FIG. 6.

An avoidance information screen 213 displaying a method (information) for avoiding this cause is displayed by clicking a display portion of one cause in the cause list (FIG. 7). In this embodiment, for example, when a display portion 211e of the spring fatigue (cause) is clicked, a spring fatigue avoidance information screen 213 shown in FIG. 7 is displayed. For example, such information that it is necessary to exchange springs periodically in order to avoid the spring fatigue is displayed on this screen 213. In detail, information 213a that it is necessary to perform exchange for each two years when pressure of 1.2 tons or less is applied (corresponding to 1,000,000 hits), it is necessary to perform exchange for each year when pressure of 1.2 tons to 3.2 tons is applied (corresponding to 500,000 hits), and it is necessary to perform exchange for each half a year when pressure of 3.2 tons to 6 tons is applied (corresponding to 200,000 hits) is displayed as criteria for exchange.

Therefore, according to the apparatus of the present invention and the above screens, when a stripping error occurs and its cause is considered to be spring fatigue, the necessity that spring exchange is performed periodically at predetermined intervals in order to avoid such an error is understood so that efficiency can be improved in machining.

Figure 8:
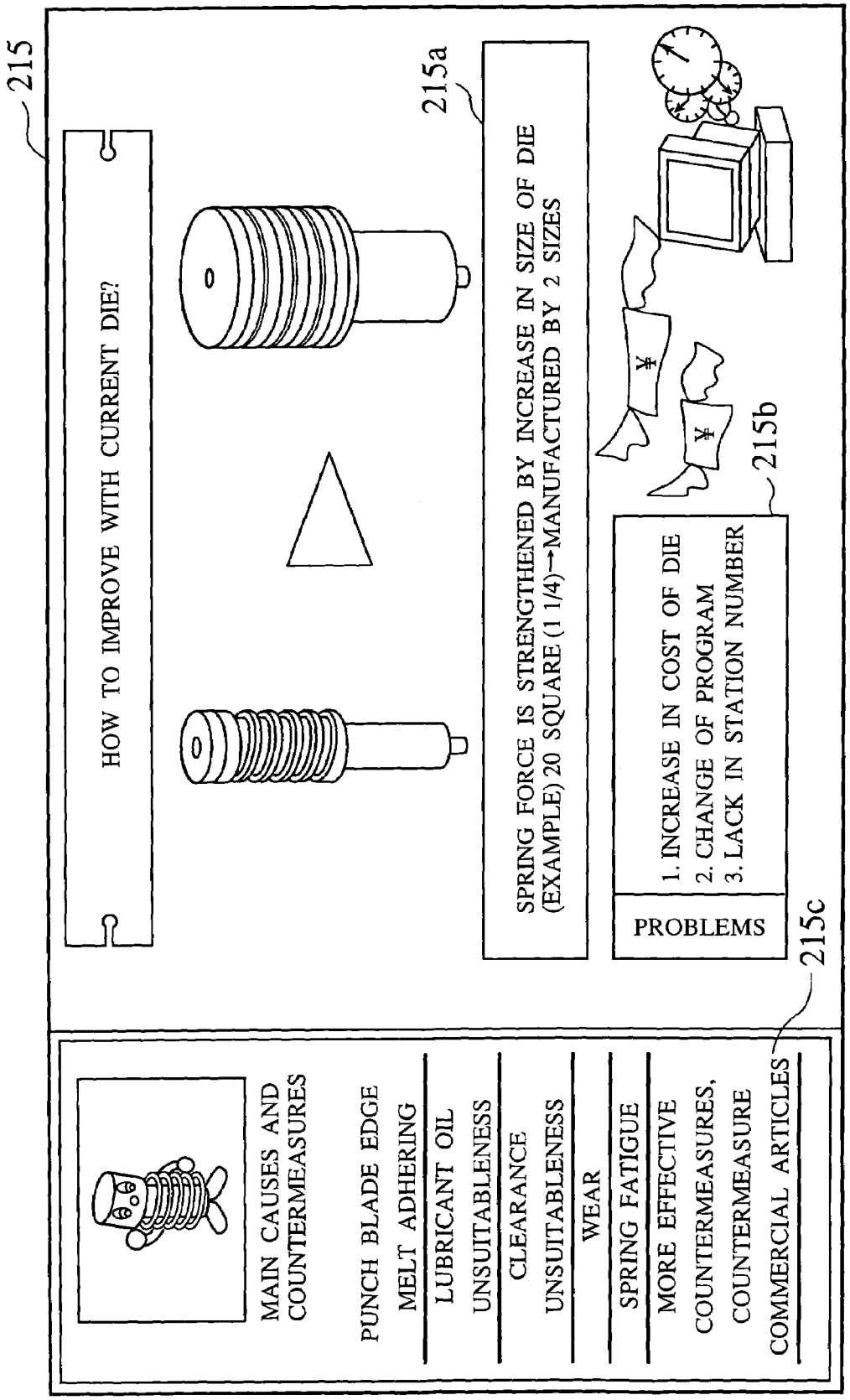
FIG. 8 is one example of an information screen displaying another method for solving the cause shown in FIG. 7.

When a predetermined portion is clicked on the screen 213 shown in FIG. 7, a screen 215 shown in FIG. 8 is displayed. A countermeasure performed on a current die to reduce the number of exchanges of the die in possible range and avoid the spring fatigue is displayed on this screen 215. In this embodiment, for example, information 215a showing necessities of increase in die size and increase in spring force is displayed. Also, as problems occurring due to use of such a die, information 215b about increase in cost of a die, necessity of change of the program, or lack in the number of turret stations is also displayed on the screen 215.

Accordingly, by referring to these information items 215a, 215b, it can easily be understood that the increase in size of the die and the increase in spring force can be applied to avoid the spring fatigue which is the problem but such problems as increase in cost of a die, necessity of program change, lack in the number of stations and the like occur.

Figure 9:
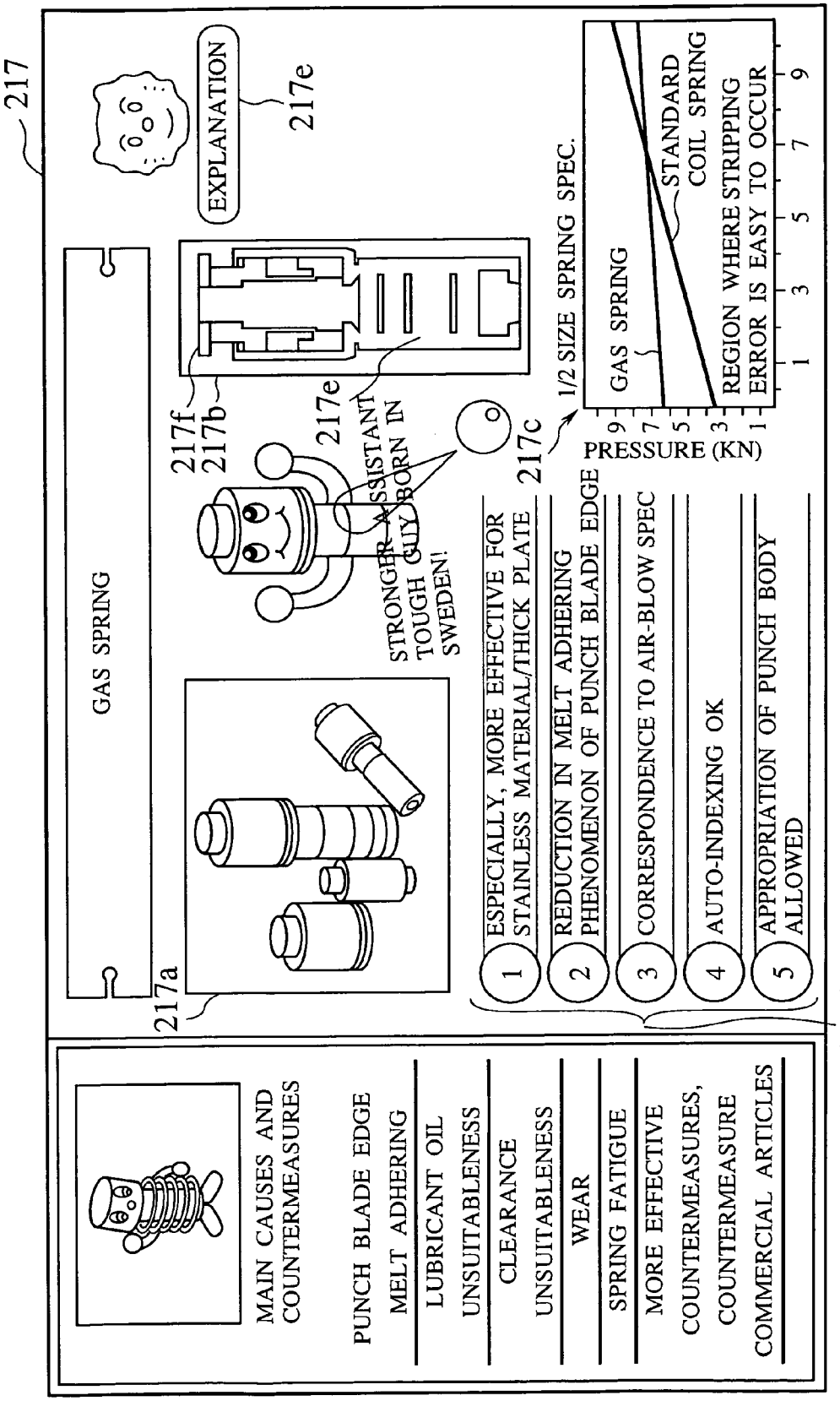
FIG. 9 is an explanatory screen for explaining a special die for avoiding the inferiority phenomenon shown in FIG. 6.

Then, when a countermeasure product 211f or 211h shown in FIG. 6, or a field 213b of FIG. 7 or a field 215c of FIG. 8 is clicked, a screen 217 shown in FIG. 9 is displayed on the display apparatus 106. In this screen 217, information 217 about a gas spring is displayed as a die for avoiding the stripping error. In particular, a sectional configuration of the gas spring is displayed at a portion indicated by reference numeral 217b. This gas spring uses a apparatus where gas is sealed instead of a mechanical spring in order to urge a punch body 217e and a punch head 217f of a punch die upward against a punch guide 217b.

Displayed on the screen 217 is also a graph 217c showing that the pressure of the gas spring is larger than that of the mechanical spring in a region where a stripping error is easy to occur. Furthermore, displayed on the screen 217 is information 217d about preferable functions or effects obtained by a punch die of the gas spring.

Therefore, according to this screen 217, the structure of the gas spring type die, the advantages of the gas spring compared with a standard coil spring and the preferable functions of the gas spring can be understood and grasped at once. Also, a determination can be made about whether or not a gas spring type die should be employed as a countermeasure to the current inferiority phenomenon in punching machining easily and rapidly while profitability is taken in consideration.

Incidentally, when an explanation field 217e is clicked on the screen 217, an animation where the punch body 217e and the punch head 217f are moved up and down relative to the punch guide 217b is displayed in a simulation manner on the field 217d, and sound for explaining the structure and operation functions of the gas spring die is output from a predetermined sound apparatus. Thereby, the structure, the functions and the operations of the gas spring can be understood more easily.

Figure 10:
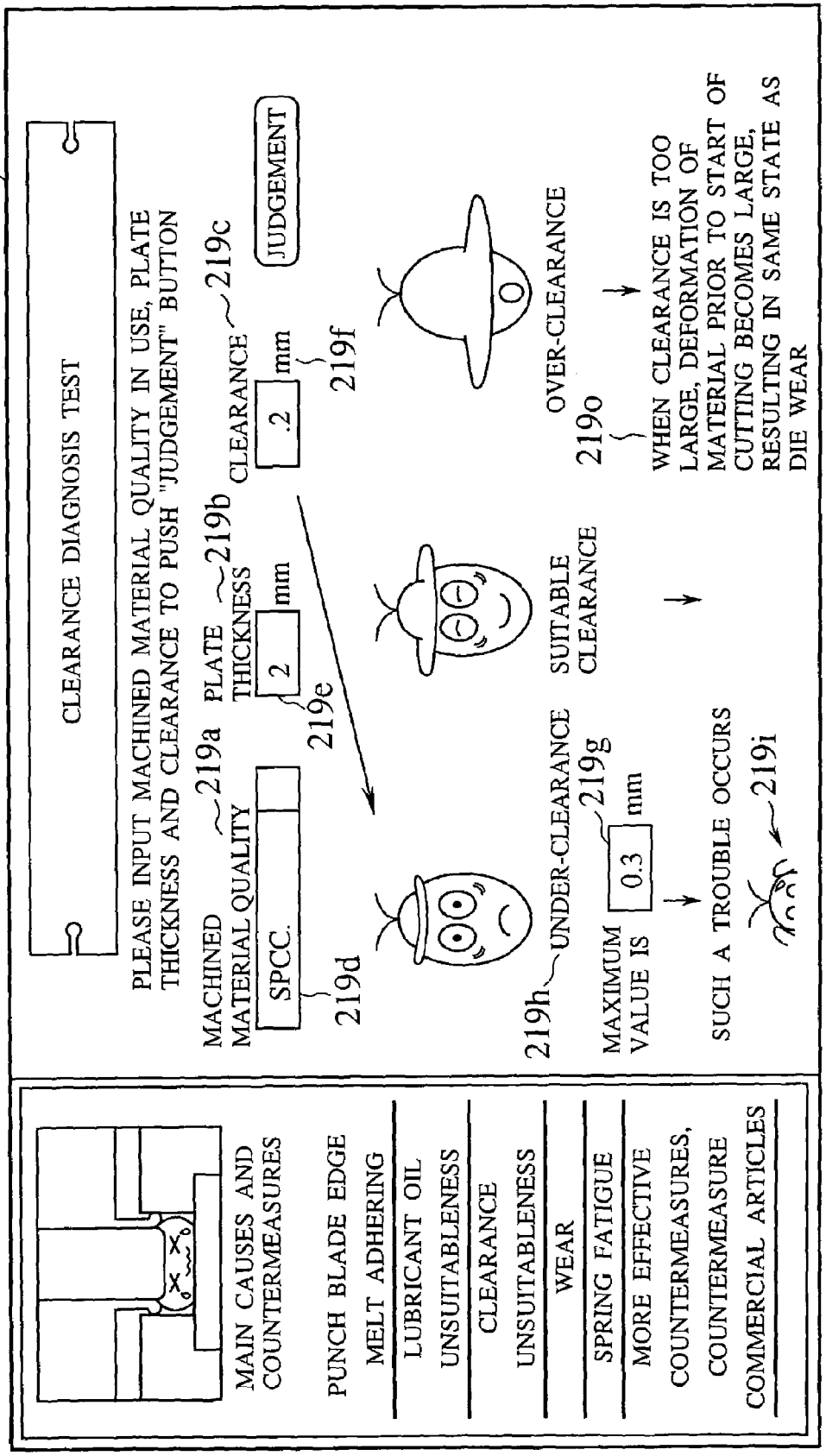
FIG. 10 is one example of a clearance diagnostic test screen serving as a reference value screen displayed on the displaying apparatus by clicking a predetermined portion on the screen shown in FIG. 6 in a case that the cause in FIG. 6 is a clearance unsuitableness.

On the screen 211 shown in FIG. 6, when unsuitableness of an clearance size formed between an inner diameter of a die and an outer diameter of a punch chip is considered as a cause of a stripping error, a display portion 211 of clearance unsuitableness is clicked on the screen 211. Thereby, reference value screen creating means is actuated so that a clearance diagnosis test screen 219 is displayed as a screen displaying a reference value (FIG. 10). In this embodiment, a question field 219a for asking machined material to be used for machining, a question field 219b for asking the thickness of the material, and a question field 219c for asking a clearance in the machining are provided on the screen 219. When an operator inserts answers to these questions, a determination is made about whether the clearance value 219f is too small, suitable or too large in view of the values 219d and 219e of the machined material quality and the thickness of the machined material. On this screen 219, it is displayed in a reference value display field 219g that a standard value of a clearance to the machined material quality 219d and the thickness 219e is 0.3 mm, and a display 219h showing that a value 219f of the clearance is small as compared with the reference value is displayed.

Figure 11:
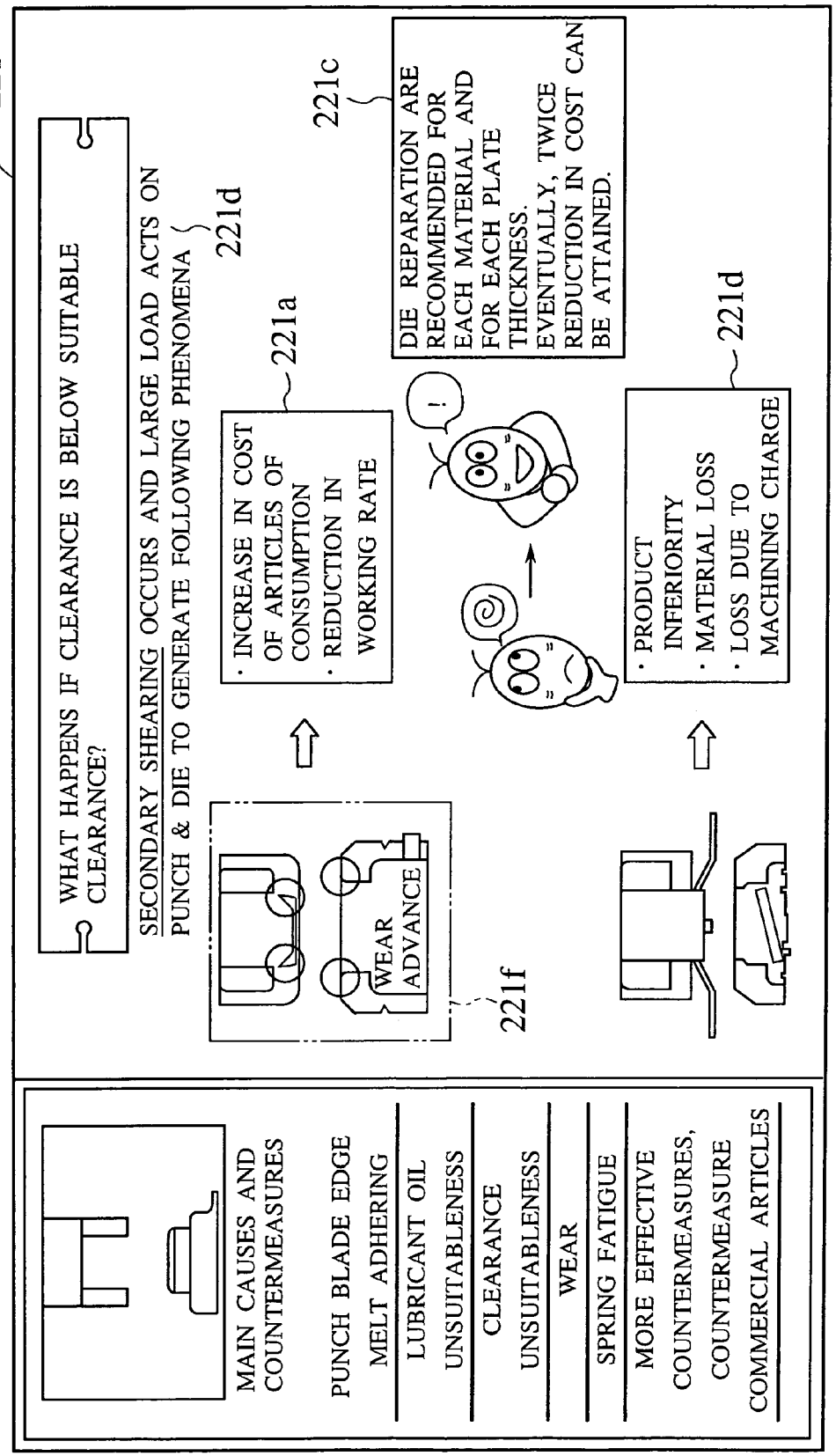
FIG. 11 is an accompanying disadvantage and the like display screen which is displayed by clicking a predetermined portion on the screen shown in FIG. 10, for displaying an accompanying inferiority phenomenon or disadvantage due to the clearance unsuitableness.

Next, when a display portion 219i relating to the display 210h is clicked, a screen 221 is displayed on the display apparatus (FIG. 11). This screen 221 is an accompanying disadvantage display screen 221 display other inferiority phenomena or disadvantages which may occur when the clearance is below the suitable clearance. In detail, description 221d is displayed on the screen 221 that, when the current clearance is smaller than the suitable clearance, the secondary shear occurs so that a large load applied to a punch and die. Also, a description 221a is displayed that according to advance of wear in a punch and a die, cost in consumption increases and the working ratio is lowered. Furthermore, a description 221b is displayed that product inferiority occurs, loss in material occurs and loss in machining charge occurs. Also, a description 221c "twice or more decrease in cost can be realized by selecting a die for each material/plate thickness" is displayed.

Accordingly, referring to the screen 221, it is understood that, when the current clearance is smaller that a suitable clearance, various disadvantages or inferiority phenomena occur, and it is understood that the double or more decrease in cost can be achieved by using dies having different hole diameters for respective materials or plate thicknesses. Thereby, it is understood that it is important to set a clearance to a suitable value in order to achieve rapidness of machining or accurate machining and for attaining decrease in cost. As a result, by referring to this, a suitable clearance can be achieved, accuracy in machining can be improved, working ratio can be increased, and decrease in cost can be attained.

Incidentally, displayed on the screen 219 (FIG. 10) is information 219j that, when the clearance is larger than a suitable clearance, "deformation of material becomes large prior to start of cutting, which results in the same as a case that the die has been consumed". Thereby, it is understood that a drawback occurs even when the clearance is too large, and importance of selecting a clearance suitably is understood.

Therefore, by referring to these screens, a clearance can be selected suitably, and accuracy in machining, rapidness in machining or decrease in cost can be achieved.

Figure 12:
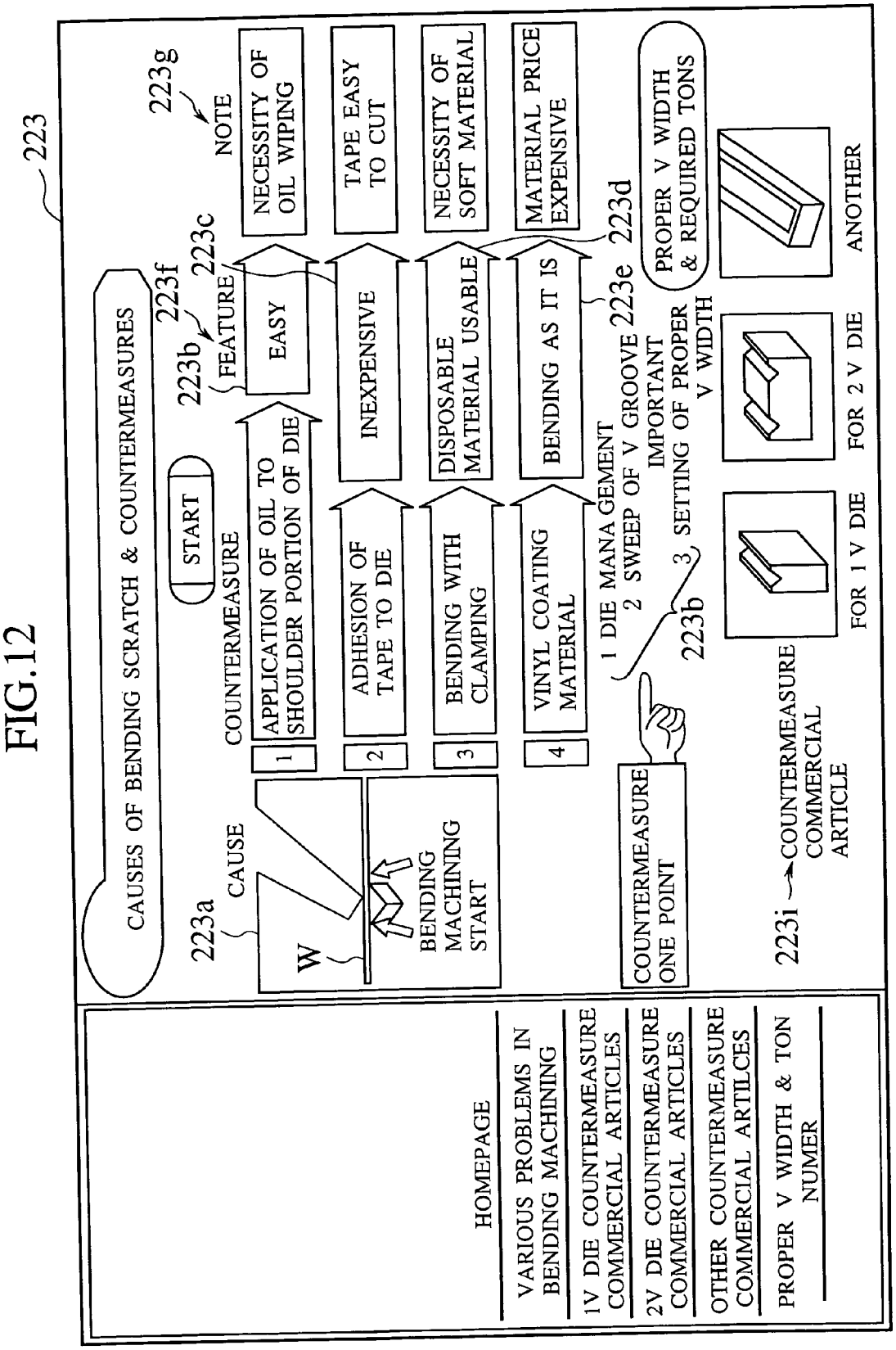
FIG. 12 is a cause/countermeasure screen which is displayed by clicking a display portion of the characters "BENDING" on the screen in FIG. 2, for displaying a cause of an inferiority phenomenon in a bending machining and a plurality of countermeasures for avoiding the inferiority phenomenon.

Referring to FIG. 2 again, when a bending field 203b for various phenomena countermeasure is selected, a screen 223 shown in FIG. 12 is displayed in the display apparatus. This screen 223 is a cause/countermeasure screen showing bending flaw occurrence of various inferiority phenomena and a plurality of countermeasures (a first kind of countermeasures) for avoiding the bending flaw occurrence. Incidentally, the bending flaw means a flaw occurring at a machined portion of a material indicated by each arrow of an explanation diagram 223a on the screen 223. As the countermeasures to the bending flaw, application of oil to a shoulder portion of a die (223b), attachment of a tape to a die (223c), application of clamping state bending (223d), application of vinyl-coating (223e) and the like are displayed on the screen 223. Incidentally, regarding these countermeasures, their features and directions corresponding to these countermeasures are also displayed, respectively (223f, 223g). Also, besides the specific countermeasures, general countermeasures for avoiding bending flaw occurrence are displayed in a field 223h on the screen 223. Especially, as the third countermeasure of the general countermeasures, setting of proper V width to required tons is displayed.

Accordingly, by referring to these displays, it can be understood easily that when bending flaw occurs, what is considered as its cause, or which countermeasures can be employed to the cause (general countermeasures and specific countermeasures). Therefore, one or a plurality of these countermeasures can be employed to minimize bending flaw occurrence in a bending machining.

Figure 13:
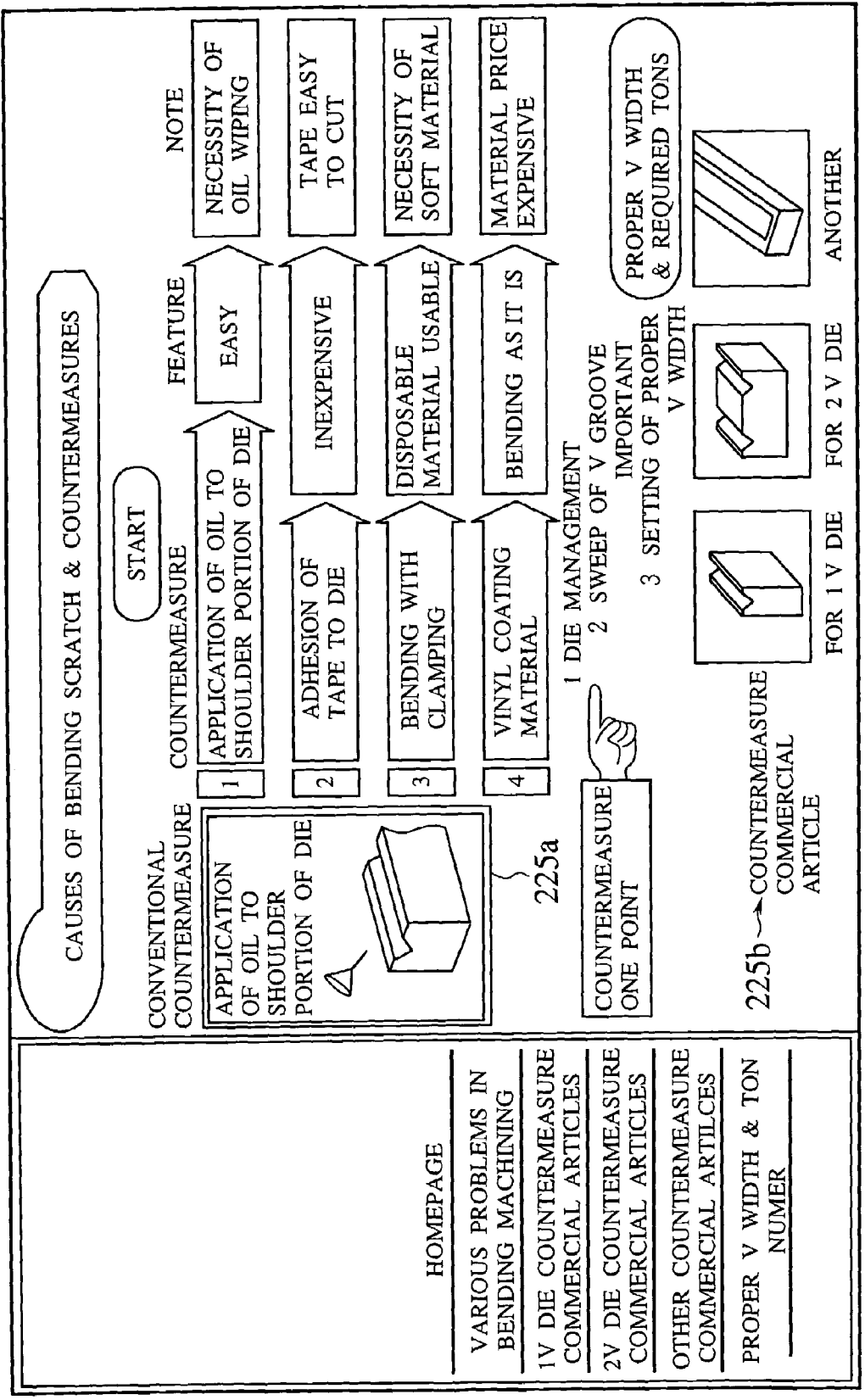
FIG. 13 is a screen for explaining the details of a predetermined countermeasure in FIG. 12.

For example, when a display portion 223b of countermeasure 1 is clicked, a screen 225 shown in FIG. 13 is displayed. Displayed on this screen 225 is a specific operation "apply oil to a shoulder portion of a die" through a drawing (225a).

Accordingly, by referring to a display 225a on the screen 225, a specific content or specific operation of each countermeasure 1 can easily be understood through a drawing or characters.

Next, when a countermeasure product display portion 223i or 225b on the screen 223 or the screen 225 is clicked, a screen 227 is displayed on the display apparatus (FIG. 14). This screen 227 is a specific bending die screen showing that a new type die named "Selatic Die" can be used in order to prevent the bending flaw from occurring. Formed on the screen 227 is a display 227b that a suitable material capable of using the Selatic Die is stainless steel, iron or the like as well as a display 227a of features of the Selatic Die.

Figure 15:
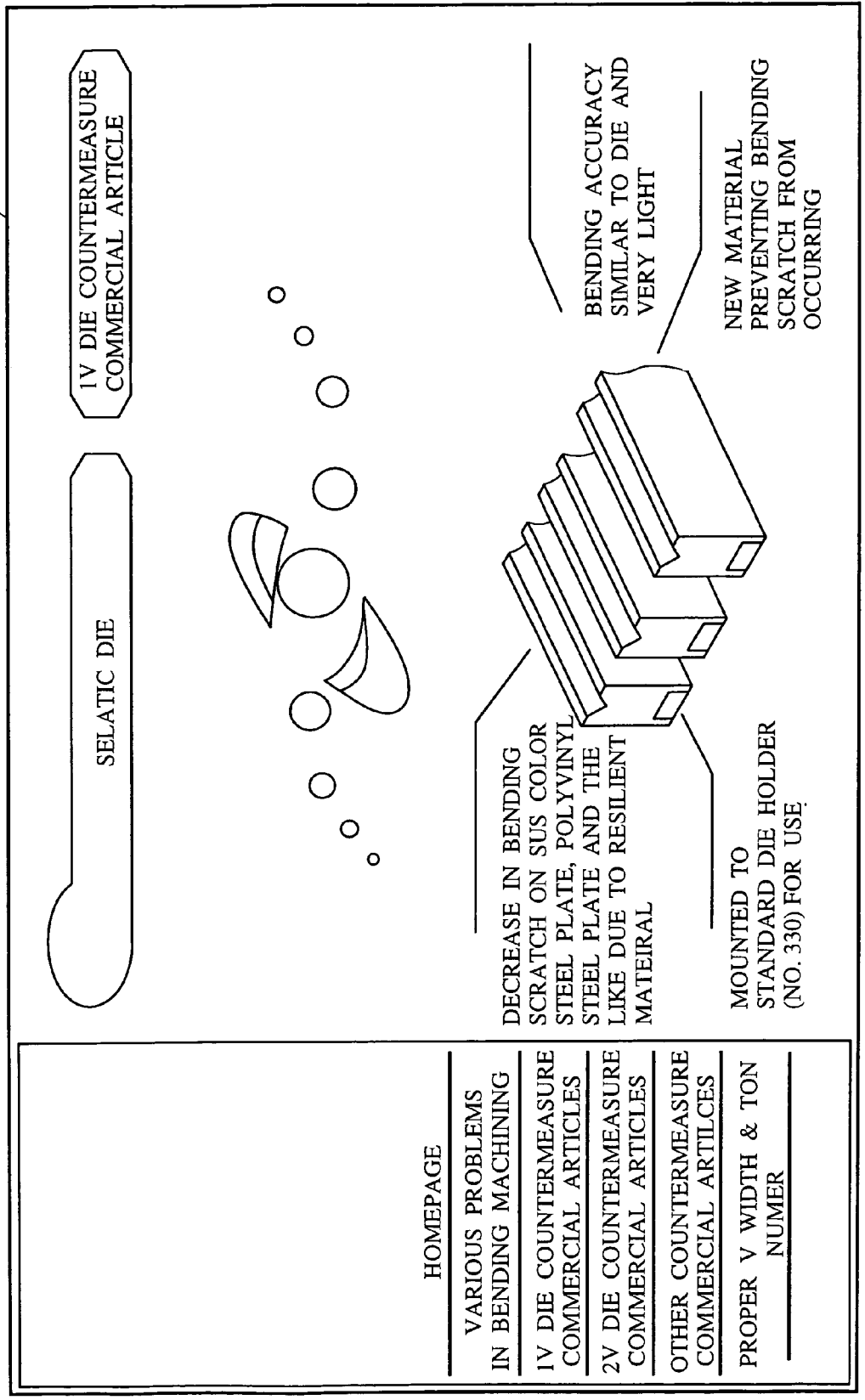

When a display 227c displaying a shape of the Selatic Die through a drawing is clicked on the screen 227, a screen 229 is displayed on the display apparatus (FIG. 15). More specific functions, suitable materials or suitable apparatus are explained on the screen 229 in detail, as shown in FIG. 15.

Accordingly, by referring to the screens 227 and 229, a new die for bending flaw countermeasure can be evaluated easily and rapidly, so that the problem about the bending flaw can be rapidly solved.

Referring to FIG. 2 again, when the display portion 205 of Question and Answer is clicked on the screen 200, the past questions and the answers thereto are displayed in a mutually related state. By referring to these, an operator can refer to the past questions relating to the operations, functions, movements of the die and, when there is any questions relating to the current problem, he/she selects these questions so that he/she can easily obtain the answer about the current outstanding problem of the die by referring to the answers displayed relating to the respective questions. Then, when the question about the currently relating problem cannot be obtained from a list of the questions accumulated in the past, these questions are input by the question input means. Thereby, these questions are transmitted to a master supporting apparatus for supporting apparatus via a proper communication means 107, and a practically skilled answerer who operates this master supporting apparatus inputs answers to these questions into the master supporting apparatus. Thereby, these answers are transmitted from the master supporting apparatus to the supporting apparatus of the present invention, and they are stored a proper storage apparatus in this supporting apparatus. Accordingly, the current outstanding problem can be solved by utilizing this answer. Also, by storing the answer from this master supporting apparatus in a state relating to the question, an operator can refer to this question and this answer when a question similar thereto will occur, so that he/she can solve a problem which will occur in the future easily and rapidly. Incidentally, regarding a new question, when an operator operating this supporting apparatus can answer the question, the operator inputs the answer into the supporting apparatus at the place. Thereby, the answer is stored in the storage means of the supporting apparatus in a state where it is related to the question.

When a die required by a customer is a standard one, the supporting apparatus of the present invention also serves as a die retrieval apparatus for selecting the required die easily and rapidly. That is, when a die is specified with a complicated combinations of symbols and it is difficult to remember the combination of symbols, the die retrieval apparatus can select a standard die easily and rapidly by inputting intuitive data such as a machine suitable for use of a die, the shape of a die or the like.

Figure 16:
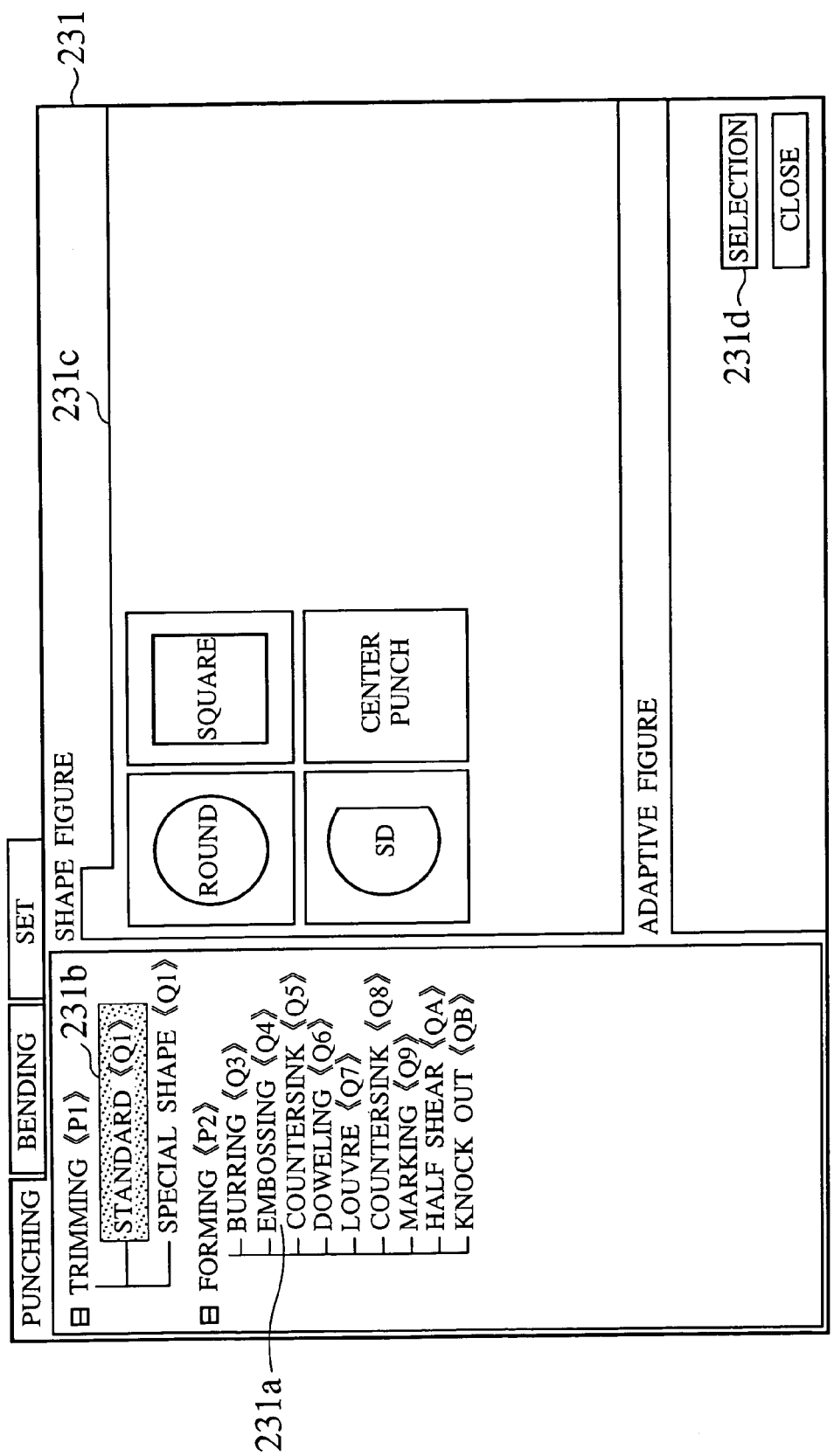
FIG. 16 is an explanatory diagram of a die list screen showing a list of punching dies/bending dies and a die data input screen in which data of standard dies is input.
Figure 17:
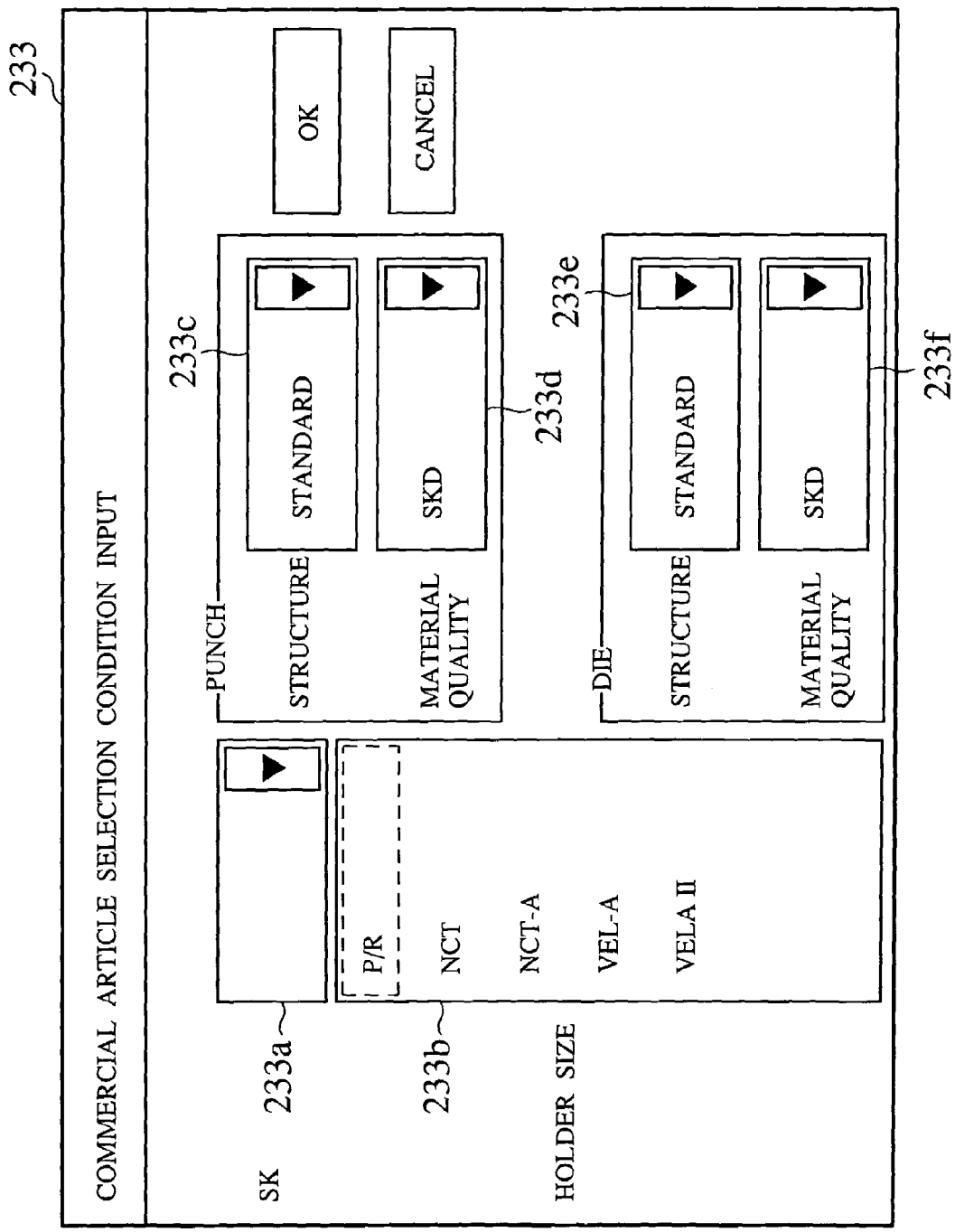
FIG. 17 is an explanatory diagram of a second die data input screen for selecting a standard die in punching dies.
Figure 18:
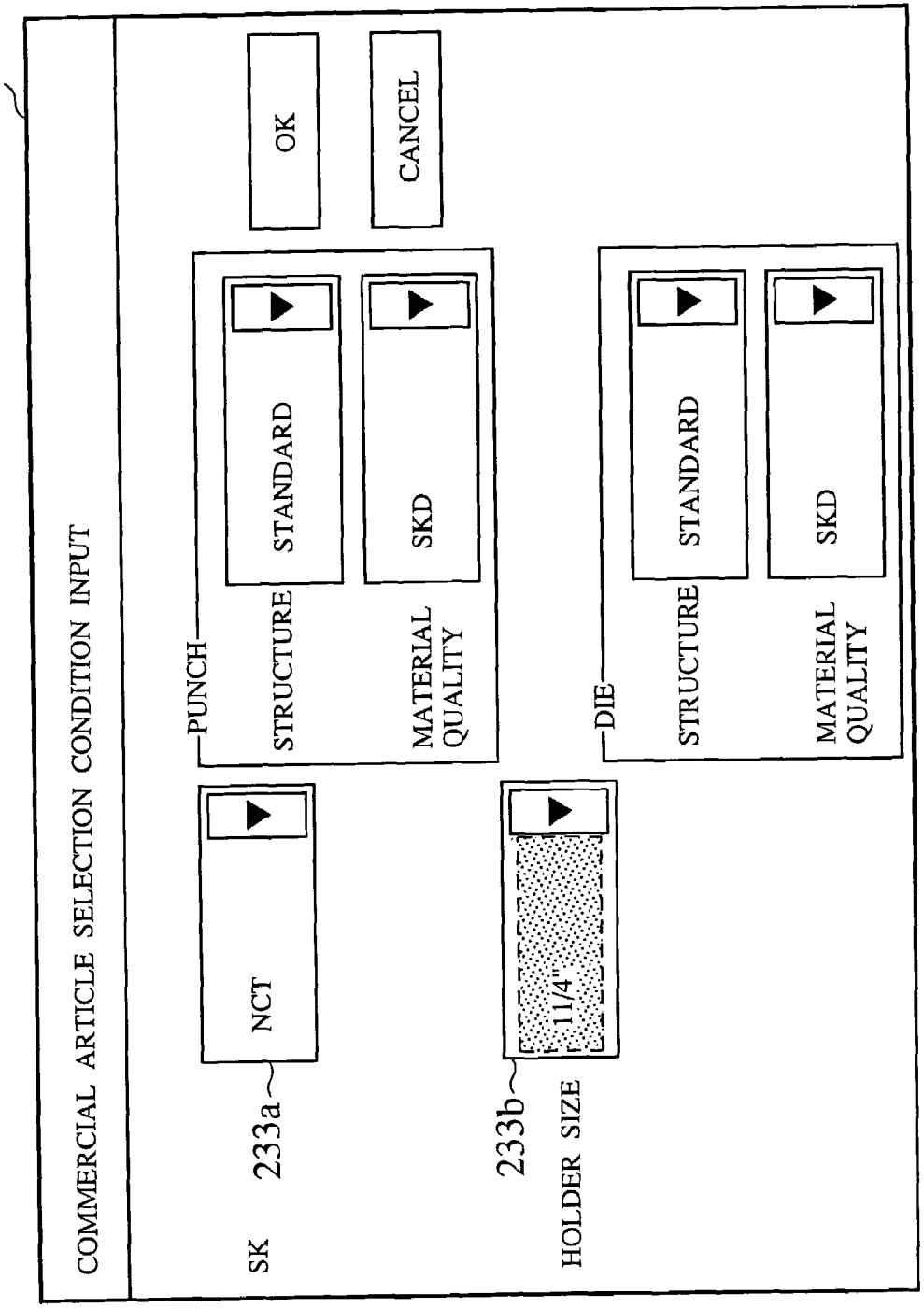
FIG. 18 is an explanatory diagram of a second die data input screen for selecting a standard die in punching dies.
Figure 19:
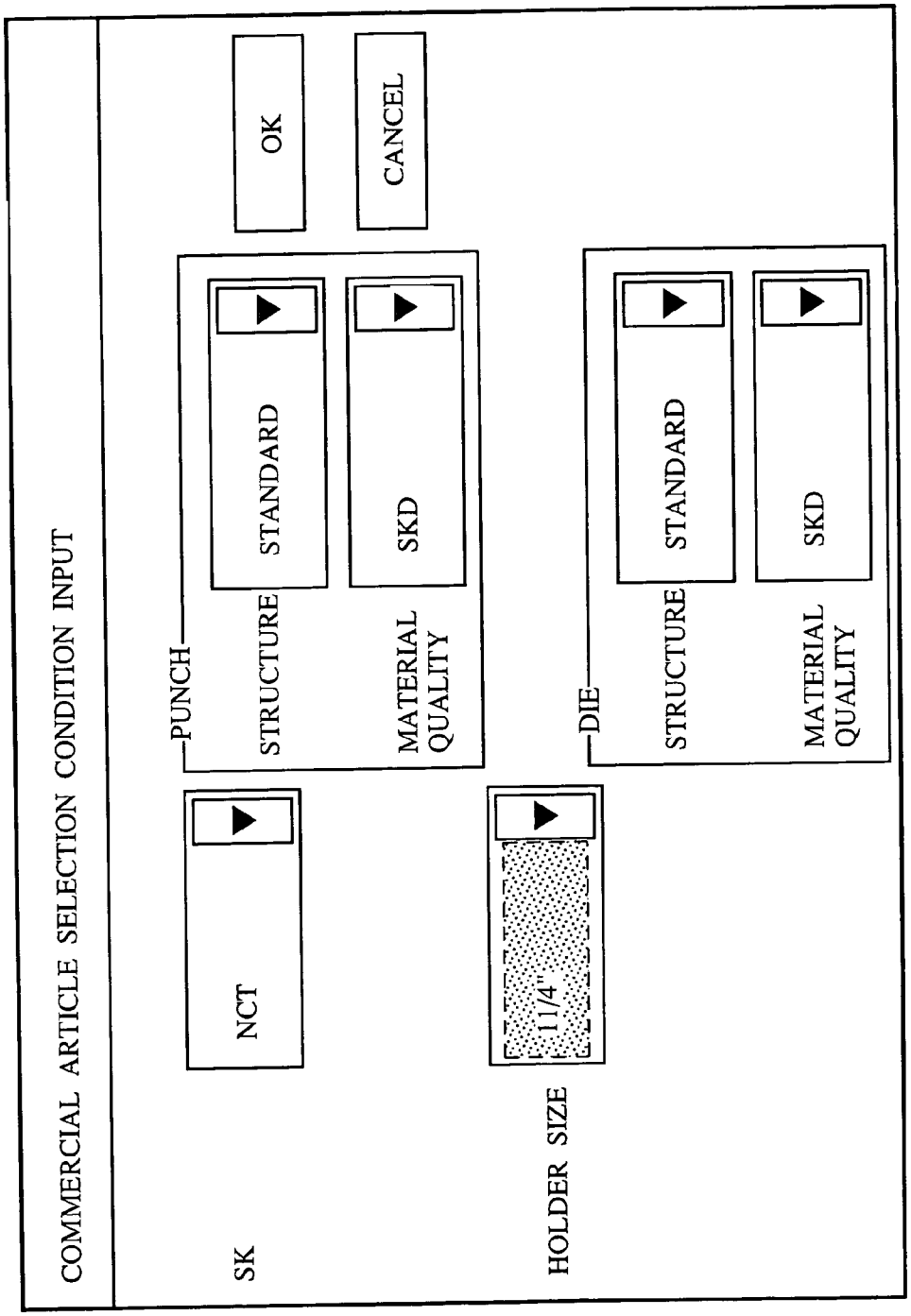
FIG. 19 is an explanatory diagram of a second die data input screen for selecting a standard die in punching dies.

This die retrieval apparatus is provided with input screen creating means which creates input screens 231, 233 which includes a field in which a plurality of shapes of a die is input, a field in which the kind of a machine using a die is input, a field in which the structure of a die is input, and a field in which material quality of a die is input. The input screen is displayed, for example, as a first input screen 231 shown in FIG. 16. Regarding, for example, a punching machining die, a list field 231a which classifies trimming dies or forming dies on this screen 231. When a standard die field 231b of the trimming dies is selected from the list field 231a, a sectional configuration of this standard die is displayed on a shape field 231c. In this embodiment, a circle, square, oval, rectangle, WD shape, SD shape, center punch, standard burring are displayed as standard shapes. Incidentally, in this embodiment, the term "standard shape" denotes the shape determined with two parameters. When a selection button 231d is pushed in a state shown in FIG. 16, the selection condition input screen 233 serving as a second input screen is displayed (FIG. 17, FIG. 18 and FIG. 19). Displayed on this selection condition input screen 233 are a field 233a in which the kind of a machine in which a die is used is input, a field 233b in which a holder size of a die is input, a field 233c in which the structure of a punch of the dies is input, a field 233d in which material quality of the punch is input, a field 233e in which the structure of the die is input, and a field 233f in which the material quality of the die is input.

Figure 20:
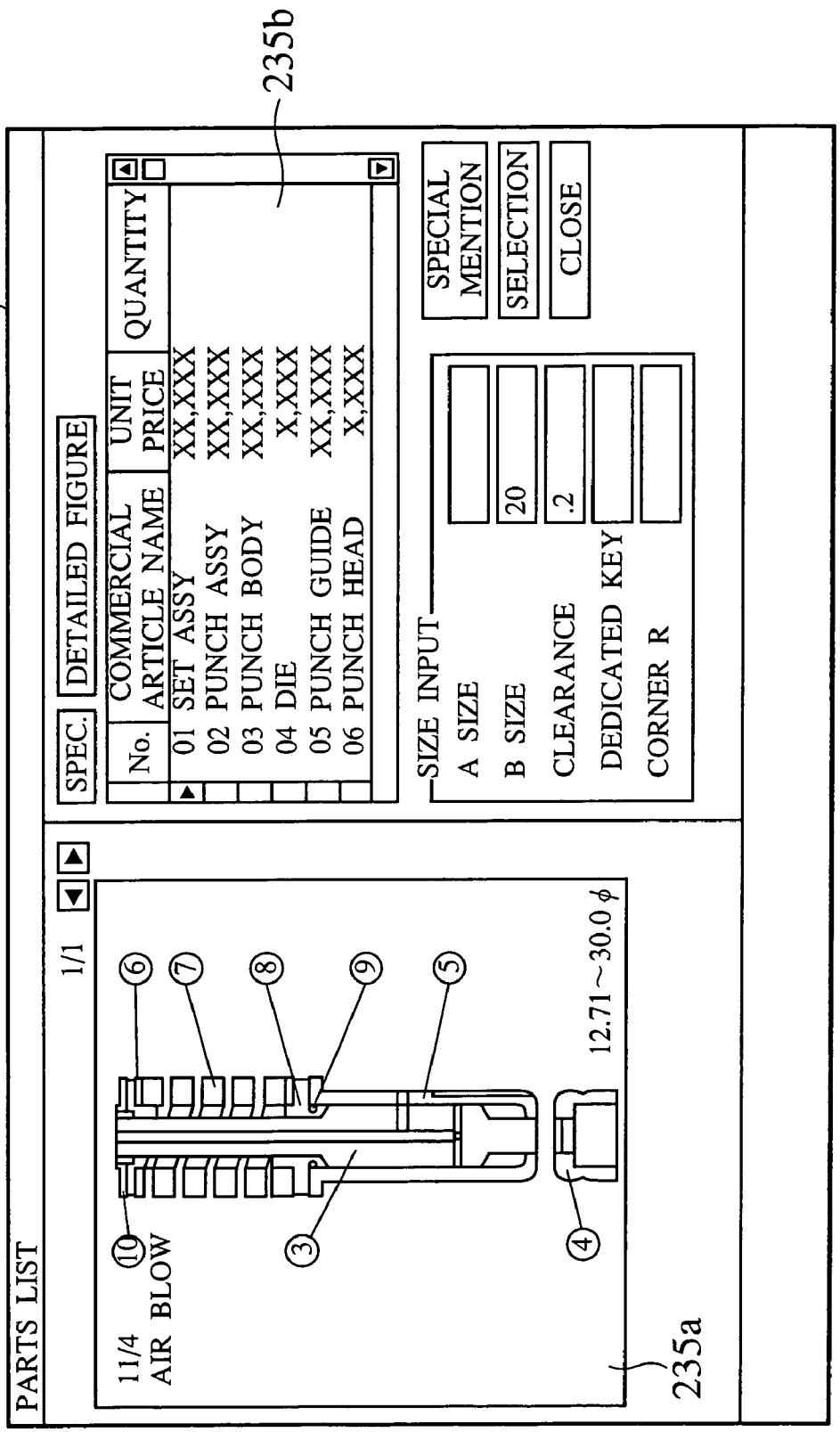
FIG. 20 is an explanatory diagram of a parts list screen which is displayed according to a standard die selection in punching dies.

Accordingly, when predetermined data is input into the respective fields 233a to 233f, whether or not a standard die meeting these conditions exists is retrieved in the supporting apparatus of the present invention. When the standard die exists, a standard die screen 235 as shown in FIG. 20 is created. Displayed on this standard die screen 235 are a sectional configuration field 235*a* showing a sectional configuration of a die attached with numbers specifying parts, and a part name unit price field 235*b* displaying the name and the unit price of each part displayed on the sectional configuration field 235*a*.

Accordingly, by referring to the screen 235, a price for each part in a standard die and a name of the part can be grasped easily. That is, according to the apparatus of the present invention, even when the complicated symbols for specifying the kind of a die is forgotten, it is possible to specify the die and obtain information about the price for each part in the die easily.

Incidentally, an error indication is displayed on the screen 231 or 233, when a die which does not exist is specified.

Next, functions of a marketing supporting apparatus according to the present embodiment performed when a required product does not exist in standard dies will be explained with reference to FIG. 21 to FIG. 31.

Incidentally, in the followings, the commercial article mainly denotes a standard product. When the article is merely called product, it denotes a standard product and a special shape-product.

In this case, the marketing supporting apparatus according to the present embodiment serves as an automatic designing apparatus.

(1) One example where, when a required product is a punching die, it is a punch which is used for punching machining will be explained.

Figure 21:
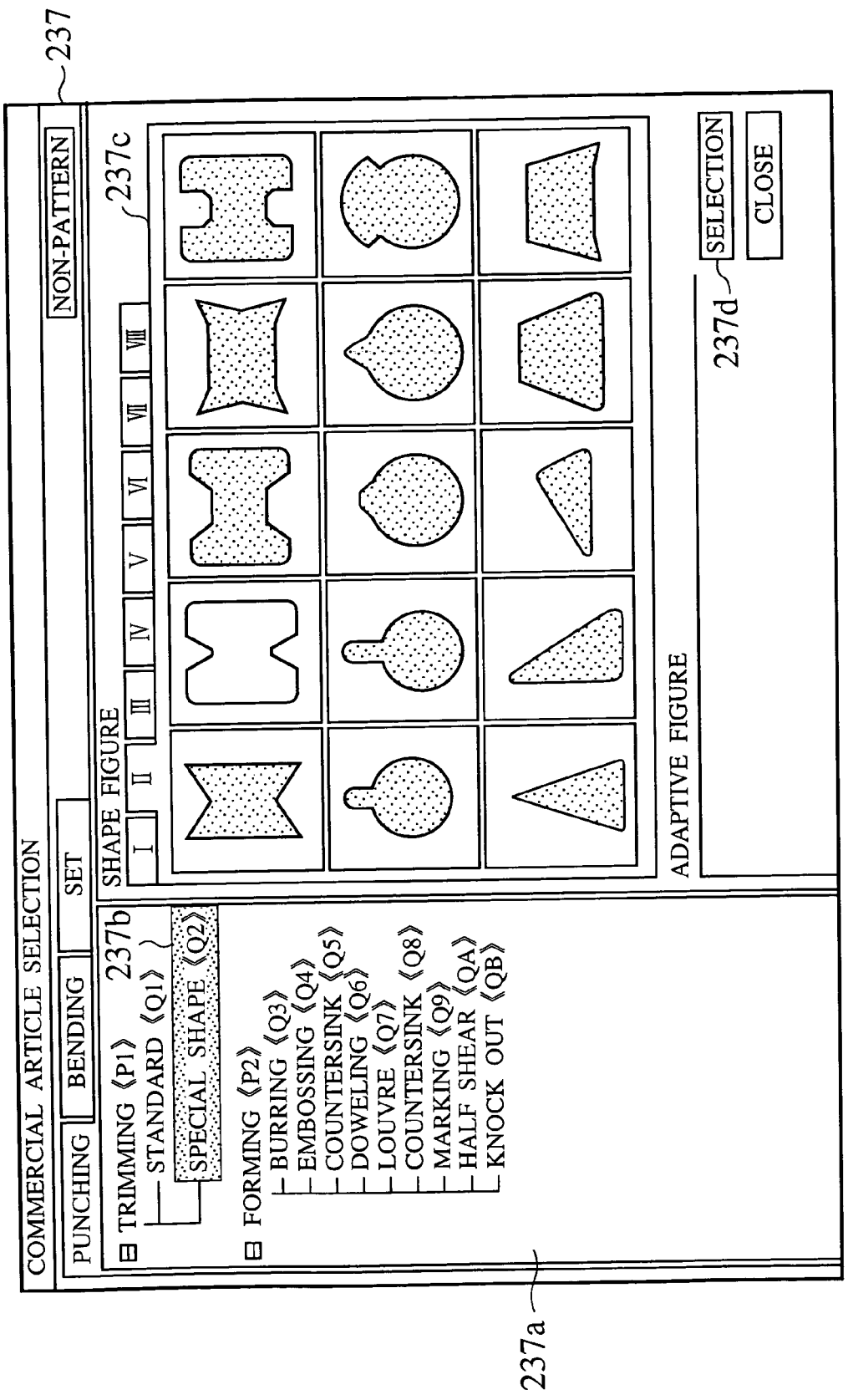
FIG. 21 is an explanatory diagram of a punching die selection screen displaying a list of punching dies and shape patterns.
Figure 22:
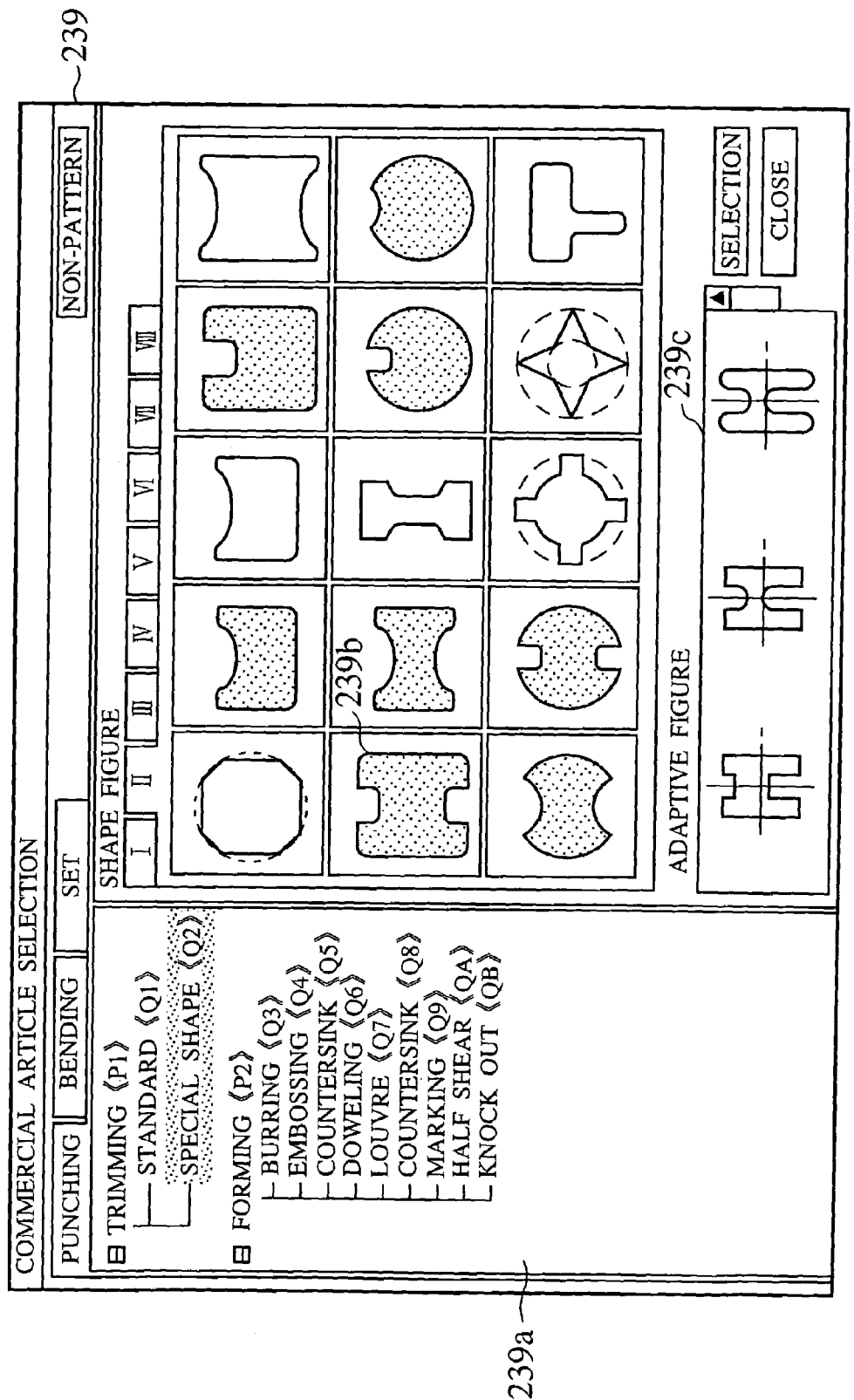
FIG. 22 is an explanatory diagram of a punching die selection screen displayed when a predetermined shape pattern is selected in FIG. 20.
Figure 26:
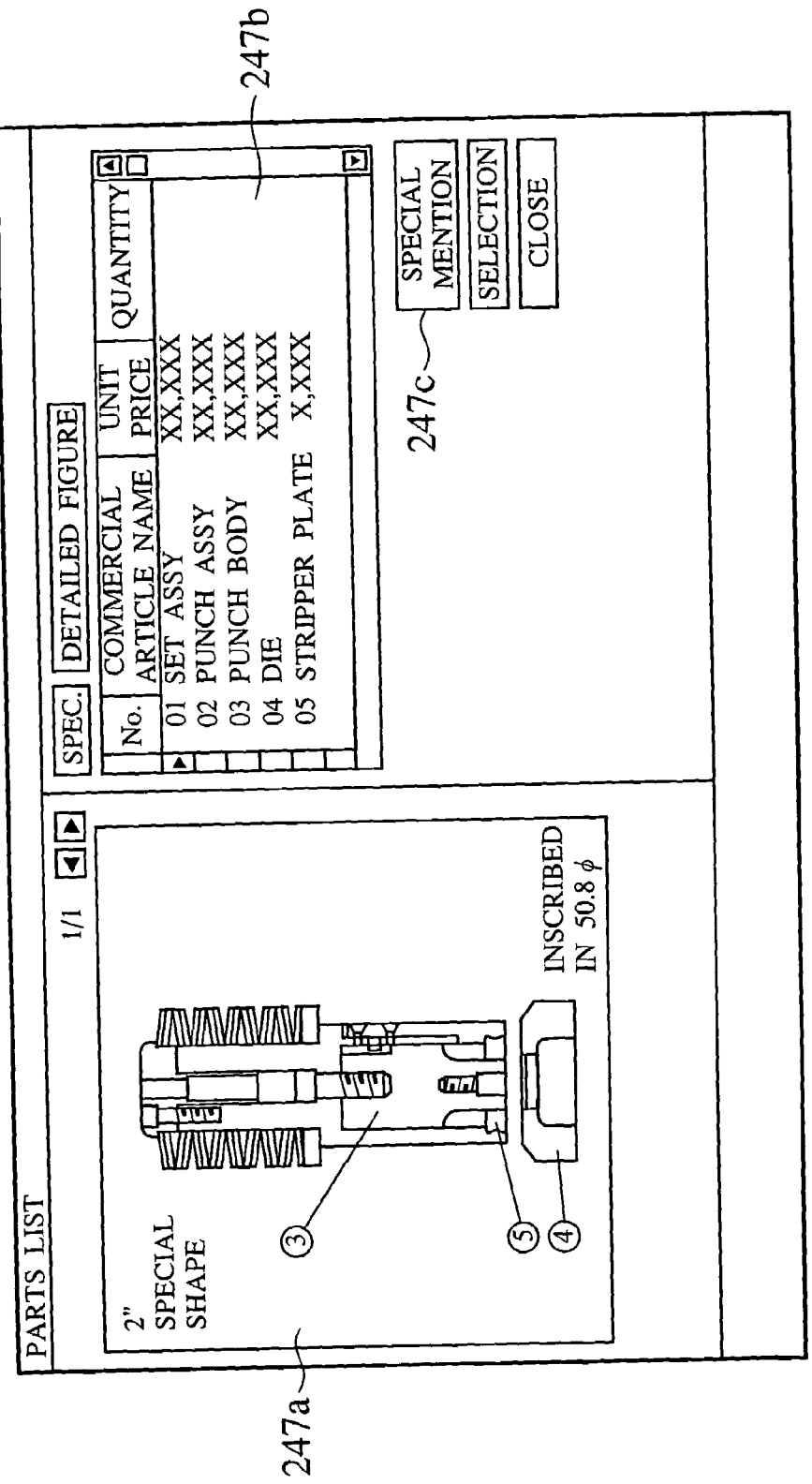
FIG. 26 is an explanatory diagram of a parts list screen displayed in response to a special die selection in punching dies.

When selection and input is performed by clicking a predetermined punch kind from die kinds 237*a* on a shape pattern selection screen 37 shown in FIG. 21 (which is merely called "clicked"), a die shape pattern selection screen creating means is actuated, and the die shape pattern selection screen creating means displays a plurality of shapes according to the selected kind on a shape display field 237*c* in a linkage manner.

Incidentally, in a case of a punching die, the shape pattern to be displayed shows a trimming hole shape formed by the punching die.

In FIG. 21, according to selection of a special shape 237*b* for performing trimming, corresponding shapes are displayed in a field 237*c*. When one pattern among the displayed trimming hole shape patterns is clicked and a selection field 237*d* is clicked, die size parameter input screen creating means is actuated. Next, the die size parameter input screen creating means displays a size parameter input screen 241 (FIG. 23) about the selected trimming shape pattern.

The product automatic designing apparatus (product parameter setting apparatus) 132 in this embodiment achieves automatic designing by retrieving the database 105. Shape data, material data, and commercial article data which are classified on the basis of shape patterns are stored in a corresponding manner in the database 105. Data of a product group corresponding to the shape patterns is divided to standard product database 151, pattern special shape (non-standard product to which a shape pattern is applicable) database 152, and non-pattern special shape (non-standard product to which a shape pattern is not applicable) database which are then stored in respective memory regions.

Incidentally, as shown on the screen 239 (FIG. 22), various patterns, namely, adaptive shapes 239*c*, which can obtain a specific shape by performing shape change on the basis of the selected trimming shape pattern in a stage where a predetermined shape pattern has been clicked on the shape pattern selection screen 237. Accordingly, a confirmation can easily be made about which trimming hole shape pattern the required special shape die belongs to.

Figure 23:
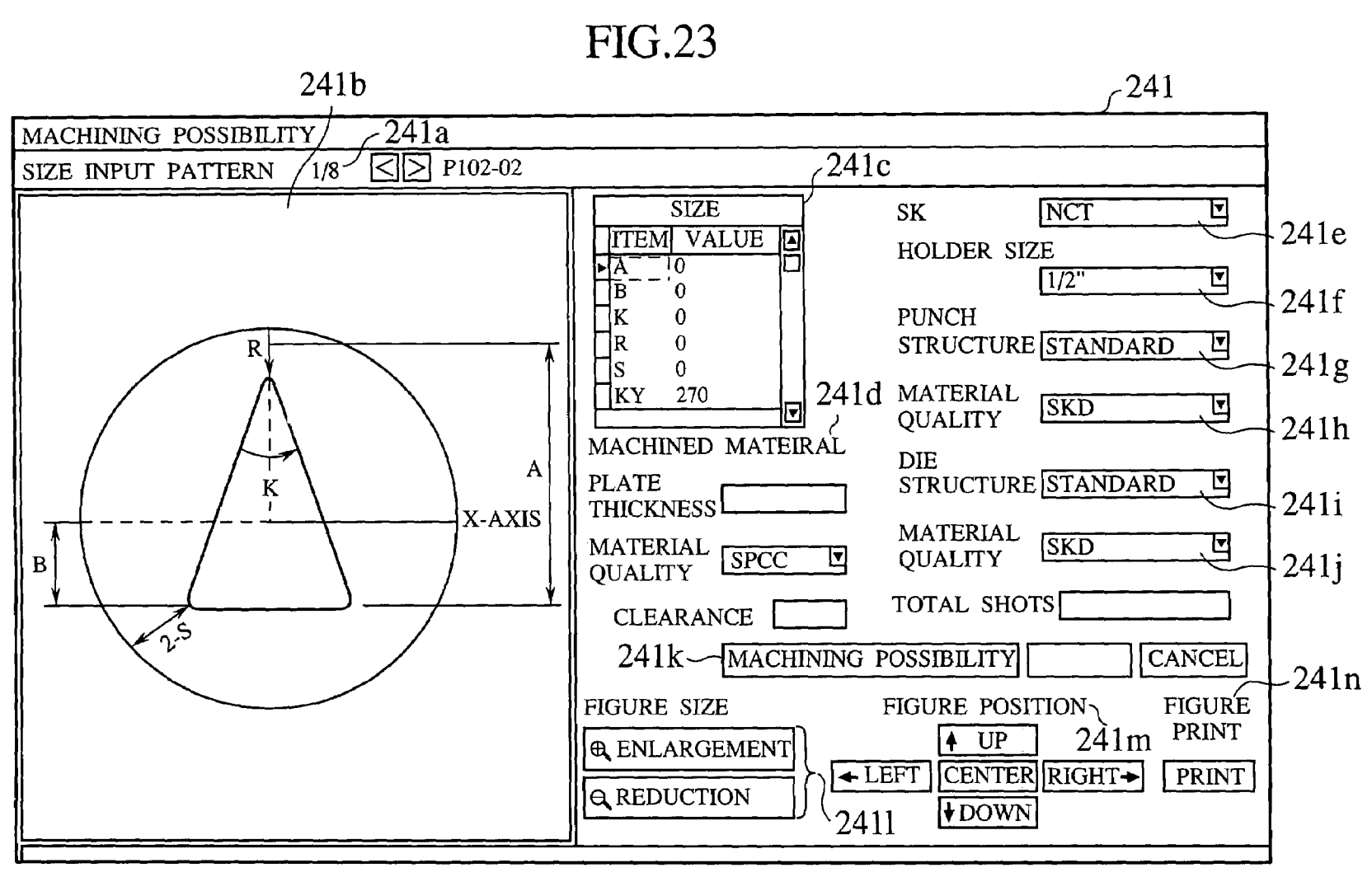

FIG. 23 shows a die size input/output screen 241 for inputting size parameters corresponding to the shape pattern selected on the screen 237.

A figure 241*b* of the selected trimming hole shape pattern is displayed on the screen while size parameters to be input for specifying a shape is displayed on a shape pattern in a corresponding manner. Reference symbols A, B, K, R and S are size parameters required for specifying a trimming hole shape. While referring to the figure display 241*b*, required sizes are input into size parameter input field 241*c*. Here, when the size parameters are input, the trimming hole shape portion of the figure in the figure display 241*b* is changed in shape according to the input parameter values. Also, enlargement or reduction (241*l*) or positioning (241*m*) of the figure display 241*b* can be performed optionally. The displayed figure can be printed (241*n*).

Also, the size parameters shown about the shape pattern which is the size input screen 241 are registered as a plurality of combinations thereof in advance, and the respective combinations are limited to the minimum number of combinations required for specifying a shape which includes sizes. For this reason, it is made possible to specify the required special shape die by input of the minimum number of parameter according to the size data specified by a customer. As shown in a size input pattern display field 241*a*, the first parameter combination among 8 pattern-registered size parameter combinations which have been registered has been displayed in FIG. 23. In order to input size parameters of a different combination, such an operation may be employed that a next size pattern screen is displayed by clicking an ordinary next screen or an entire screen calling field. It is shown in a size input pattern display field 243*b* on the size input screen 243 in FIG. 24 that the current pattern is the third size input pattern.

Incidentally, data pieces required for specifying die products except for the dies for trimming hole shapes are respectively shown in a commercial article code field 241*e*, a holder size field 241*f* showing a aperture of a holder supporting a die, and structure fields/material quality fields 241*g* to 241*j* of a punch or a die. The display contents of these fields include data which has been input in advance on the commercial article selection conditions input screen 233 (FIG. 18).

According to the above procedure, a shape including respective size parameters, a commercial article code, structure, material quality, holder size are specified, so that a design about a special shape die which is not included in standard products is completed.

Accordingly, a die specification required through a handwritten drawing(s) and the like is selected from trimming shape patterns defined preliminarily, and the selected trimming hole shape pattern is shape-changed by applying specific size parameters thereto, so that a desired trimming hole shape can be specified.

(2) A case where a required product is a bending die.

Next, an example where a required product is a bending die used for bending machining will be explained. In the case of the bending die, reference shapes of respective standard products are stored as shape patterns, and a die shape meeting a required product specification can be obtained by shifting the selected shape patterns.

Figure 27:
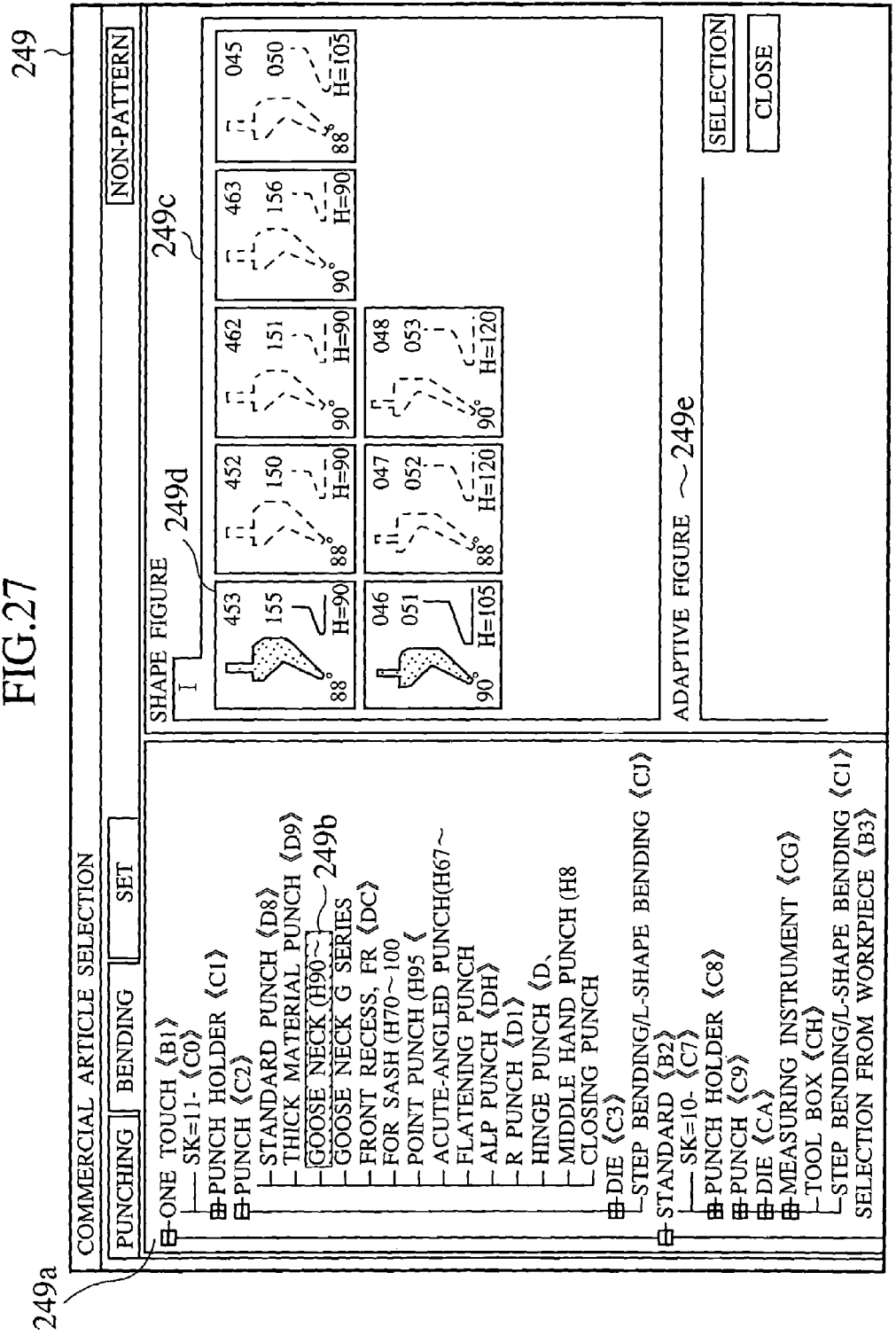
FIG. 27 is an explanatory diagram of a punch die selection screen displaying a list of bending dies and shape patterns.

When a predetermined bending kind is clicked from die kinds 249*a* on a bending shape pattern selection screen 249 shown in FIG. 27, die shape pattern selection screen creating means is actuated. The die shape pattern selection screen creating means displays a plurality of shape patterns of bending dies on a shape display field 249c in an interlocking manner according to the selected kind.

In FIG. 27, according to selection of a goose neck shape 249b, a corresponding shape patterns is displayed in a field 249c. When one pattern is clicked among the displayed goose neck shape patterns and selection field is clicked, a die size parameter input screen creating means is actuated. Next, the die size parameter input screen creating means displays a size specific input/output screen 251 (FIG. 28) about the selected goose neck shape pattern.

Incidentally, on the screen 249 (FIG. 27), various patterns, namely, adaptive shapes 249e, which can obtain a specific shape by performing shape-change on the basis of the selected goose neck shape pattern in a stage where a predetermined shape pattern 249d has been clicked on the shape pattern selection screen 249 can be displayed. Accordingly, a confirmation can easily be made about which goose neck shape pattern the required special shape die belongs to. Incidentally, as shown in FIG. 27, in the case of the bending dies, respective shape patterns correspond to specific commercial article codes and catalog numbers on a catalog. Accordingly, a stage where this shape pattern has been selected means that size parameters (including an angle) about a main portion has been specified. In FIG. 27, numeral 453 in the selected shape pattern 249d displays upper three figures of a catalog number to which the shape pattern belongs.

FIG. 28 shows a die shape specifying screen 251 in which size parameters are input according to the shape pattern selected on the screen 249.

A figure 251b of the selected goose neck shape pattern and a divided ear shape are displayed on the screen 251 with size parameter values for specifying the goose neck shape displayed on the shape pattern. An angle at a tip end portion used for bending is shown as 88° which is a predetermined value. Meanwhile, as for a tip end R (roundness of a tip end portion of a bending die), a plurality of selectable parameter values, namely 0.2, 0.6, 0.8, 1,5 and 3.0, are displayed for the shape pattern.

While referring to this figure data 251b, a desired tip end value is input into a tip end R input field 251c.

According to the above procedure, a shape including respective size parameters, a commercial article code, a catalog number, (and a structure, material quality and the like specified by the commercial article code and the catalog number) are specified, so that designing of a standard product and a special shape die which is not covered with standard products are completed.

Figure 29:
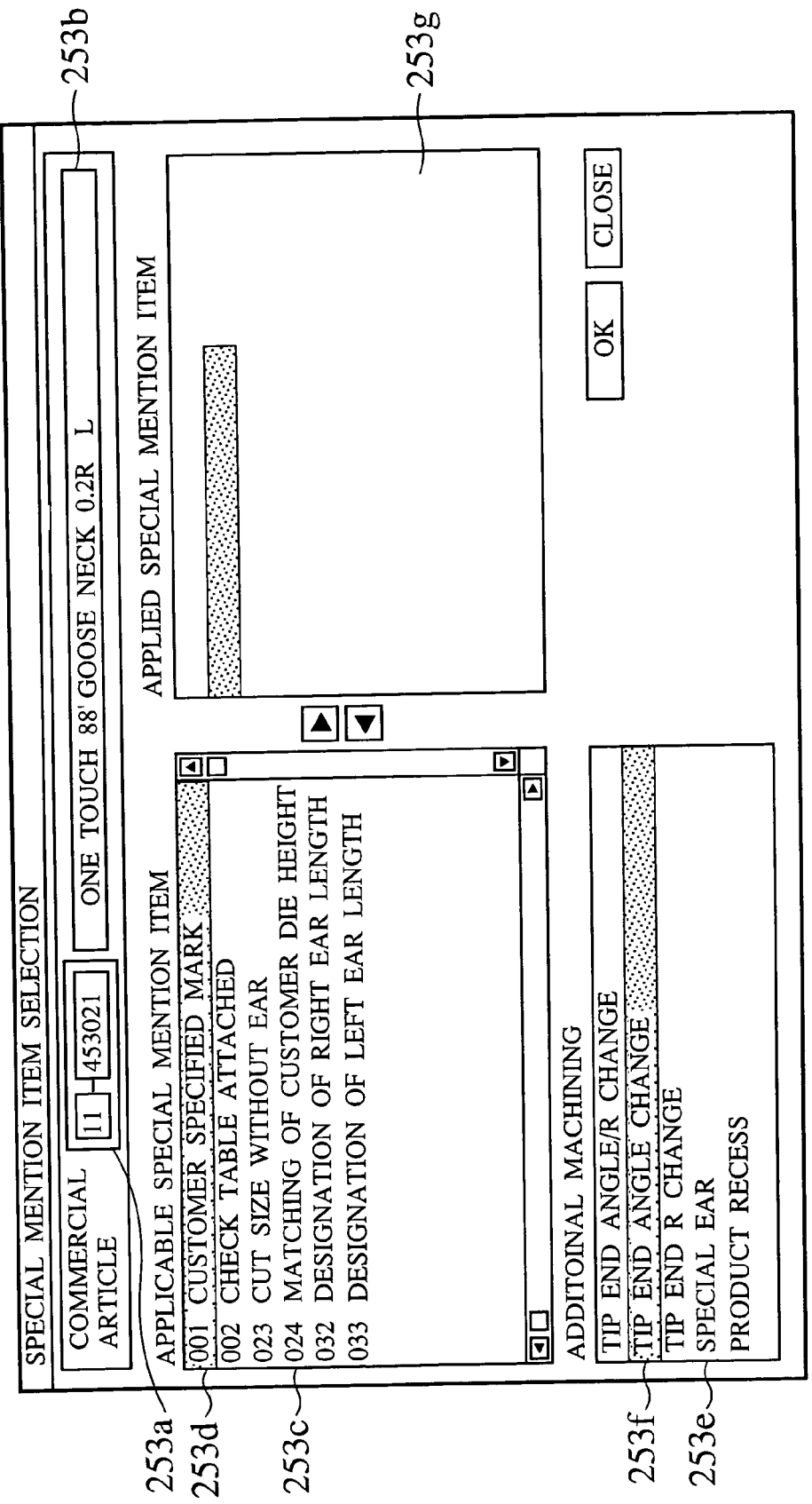
FIG. 29 is an explanatory diagram of a special item input screen displayed in response to special item input selection in FIG. 27.

Here, shape change is performed on the goose neck shape of the display 251a so that a goose neck shape of a special shape can be obtained. In this case, a special mention item field 251d shown in FIG. 28 is clicked. In response to this click, die shape specifying screen creating means is actuated. The die shape specifying screen creating means displays a special mention item selection screen 253 (FIG. 29). A commercial article code and catalog number 253a of the selected shape pattern is displayed on the special mention item selection screen 253 together with a corresponding commercial article name 253a. Special specification items which are applicable to the selected shape pattern are recited on an applicable special mention item field 253c. In FIG. 29, for example, when a customer specifying mark 253d is selected, it is copied to an application special mention item field 253g so that special mention items to be applied can be grasped easily.

Also, regarding the selected shape pattern, an additional machining item field 253e accompanying shape change is displayed on the special mention item selection screen 253. Adjustment or the like of a tip end angle, a tip end R, a special ear shape, a product recess is made selectable using the additional machining item field 253e. Here, when a tip end angle change 253f is selected, the die shape specifying screen creating means further displays a tip end angel change screen 255 (FIG. 30).

Figure 30:
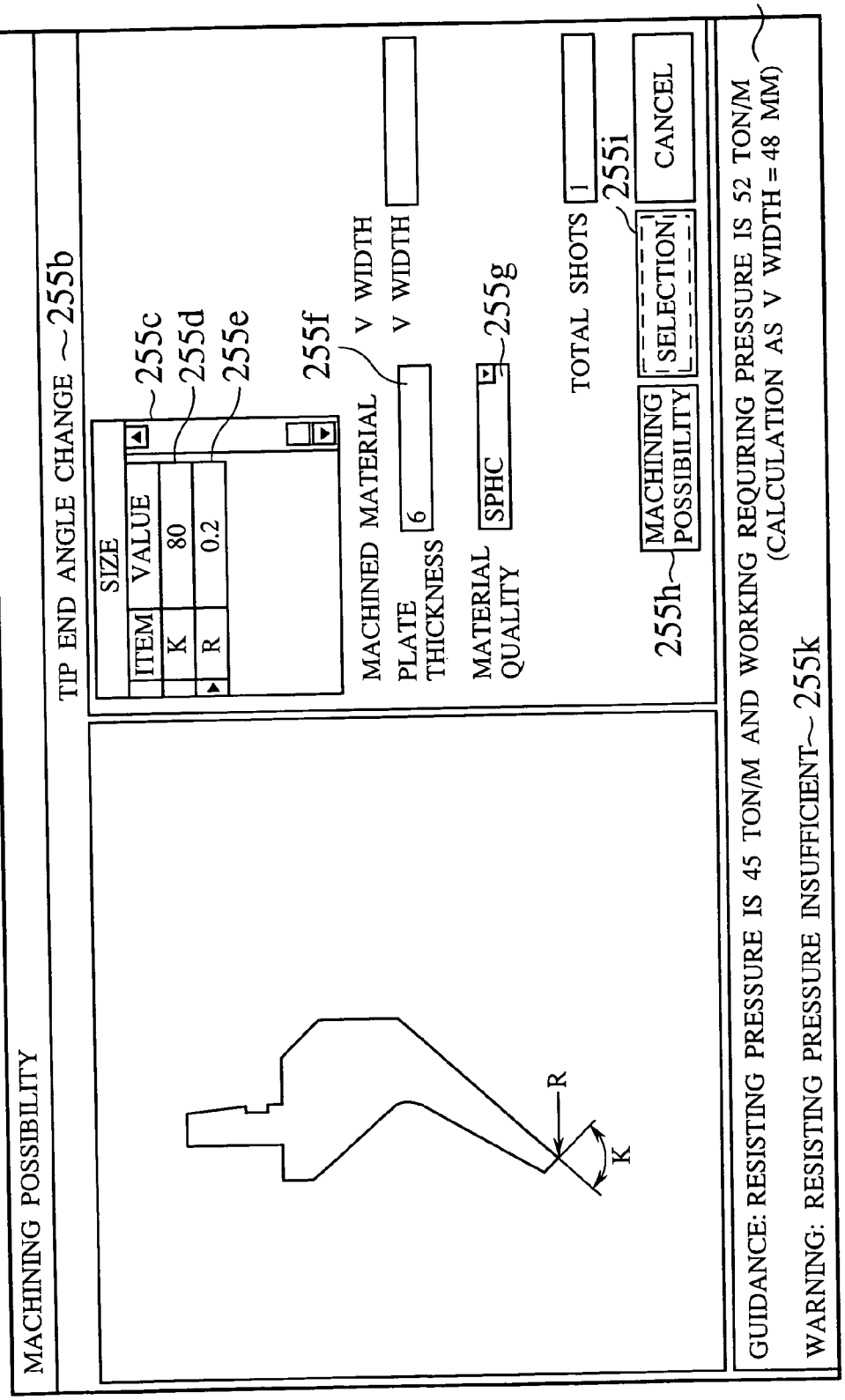
FIG. 30 is an explanatory diagram of a screen showing the result of machining possibility simulation for a bending die manufactured according to input dimension parameters, material and material quality.
Figure 31:
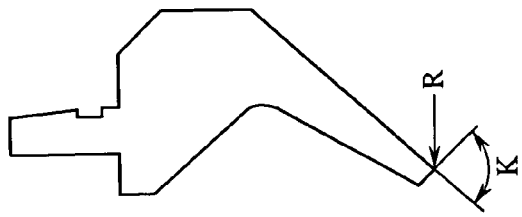
FIG. 31 is an explanatory diagram of a screen showing the result of machining possibility simulation of a bending die manufactured according to dimension parameters of different values, material and material quality in FIG. 29.

In FIG. 30, the selected goose neck shape pattern is displayed as figure data 255a while size parameters of portions capable of being additionally machined are shown. The current parameter values of a tip end angle (K) and the tip end R (R) which are changeable size parameter are displayed in a size input field 255c. A special shape bending die can be designed by replacing the displayed parameter values with desired parameter values. The shape of the figure data 255a is also changed and displayed in an interlocking manner with the replacement of the parameter values.

According to the above procedure, a shape including respective size parameters, a commercial article code, a structure and material quality are specified so that designing of a special bending die which is not covered with standard-products is completed.

Accordingly, a die specification required through a handwritten figure(s) or the like is selected from predetermined bending shape patterns without consciousness about whether the die is a standard product or it is a special shape product, and size parameters necessary for additional machining are applied to the selected bending shape pattern so that a desired bending shape can be specified by shape-changing the bending shape pattern.

Next, functions of the marketing supporting apparatus according to the present embodiment which verifies whether or not a product which has been designed according to the automatic designing apparatus can be machined will be explained with reference to FIG. 21 to FIG. 31.

In this case, the marketing supporting apparatus according to this embodiment functions as a machining possibility calculating apparatus.

(1) In a case of a punching die, first of all, one example where a punching die has been designed will be explained. The thickness and material quality of a workpiece to be machined are input into the machined material input field 243d on the above-mentioned input screen, for example, 243 (FIG. 24). As shown in FIG. 25, here, a clearance value 245f, the clearance being formed between an outer diameter of a punch and an inner diameter of a die, and the total number of shots 245g are further input, and the machining possibility field 245b is clicked. Material data input means actuated by this click delivers data of material to be machined to machining verification means according to input of the data of material to be machined.

Meanwhile, as shown in FIG. 24, according to input of a commercial article code 243e of a punch, a holder size 243f, structure and material quality 243g to 243i of a punch/a die, the die data input means delivers this shape data to the machining verification means. Incidentally, as the data pieces shown in 243e to 243i, data pieces which have been already input through input into the above-mentioned commercial article condition input screen have been displayed.

The machining verification means first performs verification about whether or not the design shape can be machined on the basis of these machined material data and die data. Specifically, the machining possibility means performs this verification by comparing resisting pressure obtained by strength calculation from die data of the selected die (shape data/structure data/material quality data) and machining requiring pressure required for punching workpiece on a specified material which is required from material data (plate thickness and material quality) with each other.

The machining verification means checks consistency about whether or not the size parameters applied to the shape pattern constitute a trimming hole shape.

In FIG. 25, the results of these verifications is displayed as a message "capable of machining" on a message field 245c.

Accordingly, determination about whether or not the die which has been designed in the automatic designing apparatus is a die which can bear an actual machining can be grasped simultaneously with the design of the die.

(2) Case of a bending die

Next, one example where a bending die has been designed will be explained. The plate thickness 255f and the material quality 255g of a workpiece to be machined are input into the machined material input field on, for example, the field 255 of the above-mentioned die shape specifying input screen (FIG. 30). Material data input means actuated by clicking the machining possibility field 255b delivers data of the material to be machined to the machining verification means according to input of these data pieces of material to be machined.

Meanwhile, as shown in FIG. 30, when respective size data, material quality data, structure data and a tip end angle or a tip end R of the shape pattern of the bending have been corrected, the die data input means delivers the die data to the machining verification means according to input of the corrected size data.

Also, as shown in FIG. 30, in the case of the bending die, the V width of the die is further input. Since this V width has been registered in advance as a default value, when input of the width is omitted, the default value is used as the V width. The V width data is also delivered to the machining verification means as a part of the die data. The machining verification means performs verification similar to the case (1) of the punching die on the basis of these material data and die data.

As shown on a machining possibility verification screen 255 (FIG. 30), the verification result about machining possibility "resisting pressure: 45 ton/m and machining requiring pressure: 51 ton/m (calculation as V width=48 mm) is displayed in the message field 255j. Simultaneously, an alarm message "resisting pressure lack" is displayed on the message field 255k to call an operator's attention.

Accordingly, a determination about whether or not the bending die which has been designed in the automatic designing apparatus is a die which can bear an actual machining can be grasped by the display of the verification result simultaneously with the designing.

Next, functions of the marketing supporting apparatus according to this embodiment which creates estimate information of a product which has been designed by the automatic designing apparatus and has been verified by the machining possibility calculating apparatus will be explained with reference to FIG. 26 to FIG. 34.

In this case, the marketing supporting apparatus according to the embodiment functions as an estimate information outputting apparatus.

As shown on the parts list screen 247 (FIG. 26), parts elating to a punch to be estimated are displayed on a arts display field 247a by selection of the shape pattern and input of the size parameters as described in FIG. 22 to FIG. 25 without directly inputting a commercial article code, a catalog number and the like. Purchase unit of the die product which has been designed and verified is displayed on a parts list display field 247b so as to correspond to the display of parts.

When a predetermined purchase unit is selected by clicking on this parts list field 247b, detail estimate information creating means is actuated. This detail estimate information creating means reflects and displays the commercial article data of the selected die product on an estimate list field 259c of the estimate detail screen 259 shown in FIG. 32.

Like the above, regarding the bending die, as shown on the parts list screen 251 (FIG. 28), when a predetermined purchase unit is selected by clicking on this parts list field 251b, detail estimate information creating means is actuated. This detail estimate information creating means reflects and displays the commercial article data of the selected die product on an estimate list field 259c of the estimate detail screen 259 shown in FIG. 32.

FIG. 32 is the estimate detail screen 259 in this embodiment. The commercial article data such as a commercial article code of a die product selected from each list, a catalog number, quantity, shape, a commercial product name and the like is displayed on the estimate list field 259c. When a calculation button 259m is clicked on the estimate detail screen 259, the estimate of each die product displayed in the list is displayed.

Price data and delivery time data about each die product to be estimated can be confirmed on the estimate detail screen 259. For example, it is assumed that, for example, a die product of a catalog number 45302E has been pointed in the second line of the estimate list field 259c. Regarding the pointed die product, unit cost 259g, price 259p, discount rate 259k, discount amount 259l and the like are displayed as price data together with a commercial article name 259f. This discount rate 259k is a value which has been set in advance for each customer and for each product (each product group). The discount amount 259l is calculated on the basis of the discount rate 259k and the product unit cost 259g, and an estimate amount is displayed as a value obtained by subtracting the discount amount 259l from the product unit cost 259g. At this time, it is possible to select application of a variable discount rate set for each customer or application of a fixed discount rate.

Simultaneously, a reference delivery time 259h, a deliverable day 259i, a customer request delivery day 259j and the like are displayed as delivery time data. As for the reference delivery time, a value (necessary days) which has been set preliminarily for each product (each product group) is displayed with a specific delivery time code in a corresponding manner.

Day obtained by decoding this delivery time code to the number of necessary days to add the same to the current date is displayed on the deliverable day 259i.

When an estimate issue button 259n is clicked on the detail estimate screen 259, information on the detail estimate screen 259 is output as an estimate 263 of a formal format which can be submitted to a customer (FIG. 34). As shown in FIG. 34, an offered price 263i to which a total discount amount 263h applied to the estimated die product is applied can be presented. Incidentally, the estimate can be output not only to a printer connected to the marketing supporting apparatus according to the embodiment but also to a facsimile provided on a place specified by a fax output indication button 261i (FIG. 33).

Accordingly, it is made possible to input a die product to be estimated easily and rapidly by specifying commercial article data from the shape pattern and the size parameters without directly inputting a commercial article code or a catalog number. Incidentally, in this time, it is a matter of course that input contents of the shape and size parameters (shape data) which have been input by the design and verification are stored and corresponding commercial article data can be input in an interlocking manner with the input means for estimate information on the basis of the stored shape data.

Also, discount data and delivery time data necessary to present an estimate is stored in advance and the estimate is prepared using these data pieces so that an instant response of a required die product can be performed.

Finally, the marketing supporting apparatus according to this embodiment which outputs and transmits order reception information according to the prepared estimate information of a product will be explained.

In this case, the marketing supporting apparatus according to the embodiment functions as an order reception information creating apparatus.

When a customer indicates his/her intention of purchase on the estimate detail screen 259 shown in FIG. 32 or in response to the output result of this estimate detail information, an order reception decision button 259o is clicked on the estimate detail screen 259.

Order reception information to which an order reception number has been given and which including the contents of the estimate information is prepared by clicking this order reception decision button 259o. Here, a sales person connects a predetermined portable communication equipment 107 (FIG. 1) to the marketing supporting apparatus according to the embodiment, and he/she online-transmits/reflects the order reception information to a head office database such as order reception database/manufacture database (not shown) or the like through the portable communication equipment 107. The order reception database in the head office is updated by the transmission of the order reception information, and simultaneously a manufacture instruction can be transmitted to a manufacture department having the manufacture database at real time to instruct manufacture start.

The manufacture schedule and the delivery schedule about the order-received die product are stored in the manufacture database in the head office. For this reason, the marketing supporting apparatus according to the embodiment can obtain deliverable day as return data to transmission of the order reception information in view of an actual schedule about the order-received die product.

After transmission of the order reception information, it is possible to output an order acknowledgment through a printer, a facsimile or the like to provide it to a customer by clicking a predetermined button on the screen in FIG. 32.

Meanwhile, in a case that the marketing supporting apparatus according to the embodiment is used off line, after an sales person returns back to a sales branch or the like, he/she may reflect this order reception information to the head office database such as order reception database/manufacture database or the like.

Accordingly, it is made possible to decide an order reception rapidly and start manufacture early. That is, the order-received die product can be delivered early.

Figure 35:
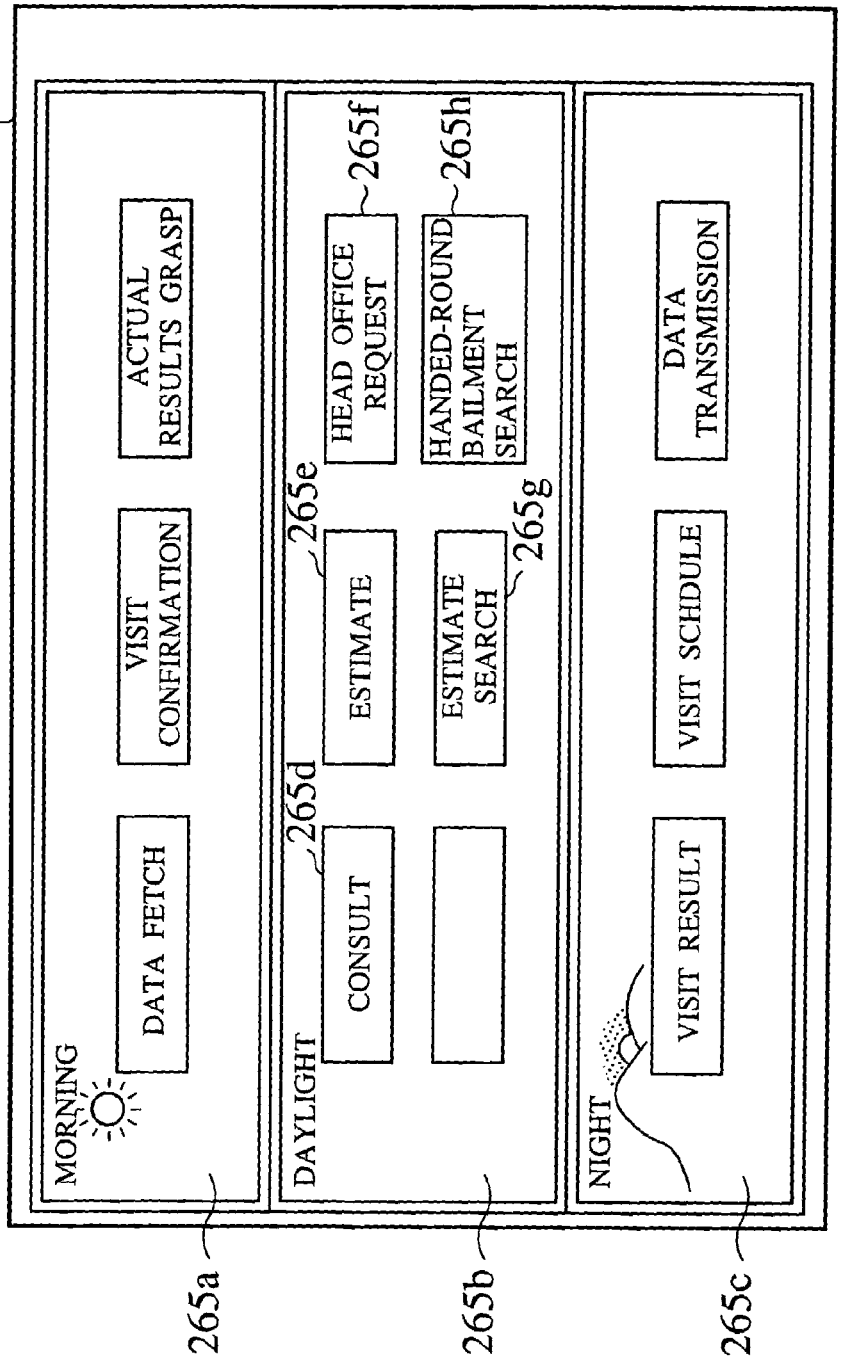
FIG. 35 is an explanatory diagram of an example of a main menu on a portable terminal for sales person according to an embodiment of the present invention.

Incidentally, FIG. 35 is an explanatory diagram of an example of a main menu 265 on a portable terminal for a sales person according to the embodiment of the present invention. A series of processings of the above marketing support belongs to a consultant 265d and an estimate 265e in a day processing menu 265b on the main menu. Besides the processings for the above-mentioned sales support, processings necessary for morning, day (daytime), and evening according to a timetable of one day of a sales person, respectively can be timely called from one main menu 265 to be processed.

FIG. 36 to FIG. 43 show another embodiment of the machining possibility calculating apparatus.

Figure 36:
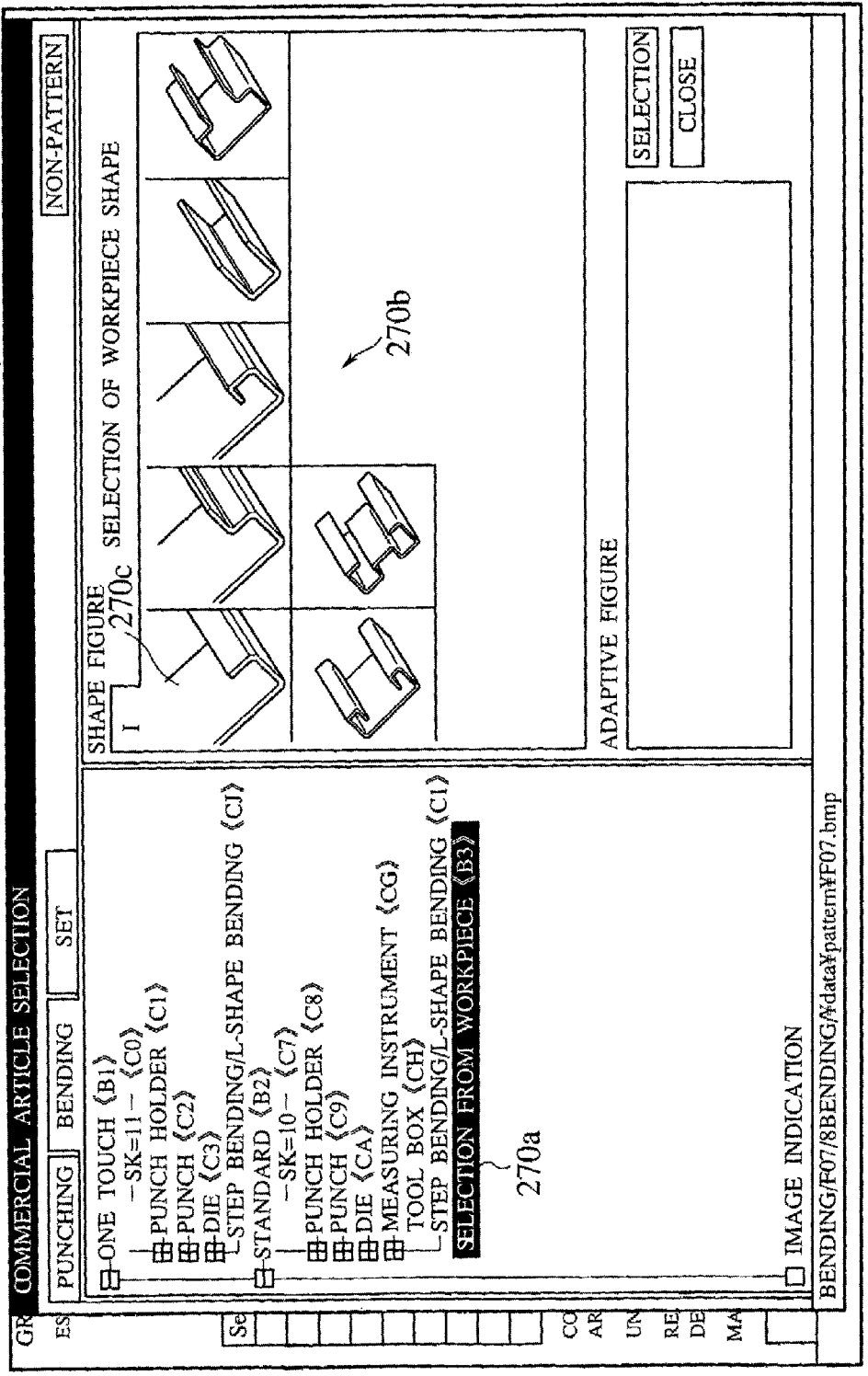
FIG. 36 is an explanatory diagram of a screen for selecting a workpiece shape on the basis of a customer's drawings.

In this case, a bending die is selected on the basis of a workpiece shape. For this reason, as shown in FIG. 36, first, a display 270a is clicked on a left field on a workpiece selection screen 270. Thereby, selection branches 270b are displayed on a right field on the screen 270. Here, for example, a workpiece shape 270c is selected on the basis of an order drawing from a customer.

Figure 37:
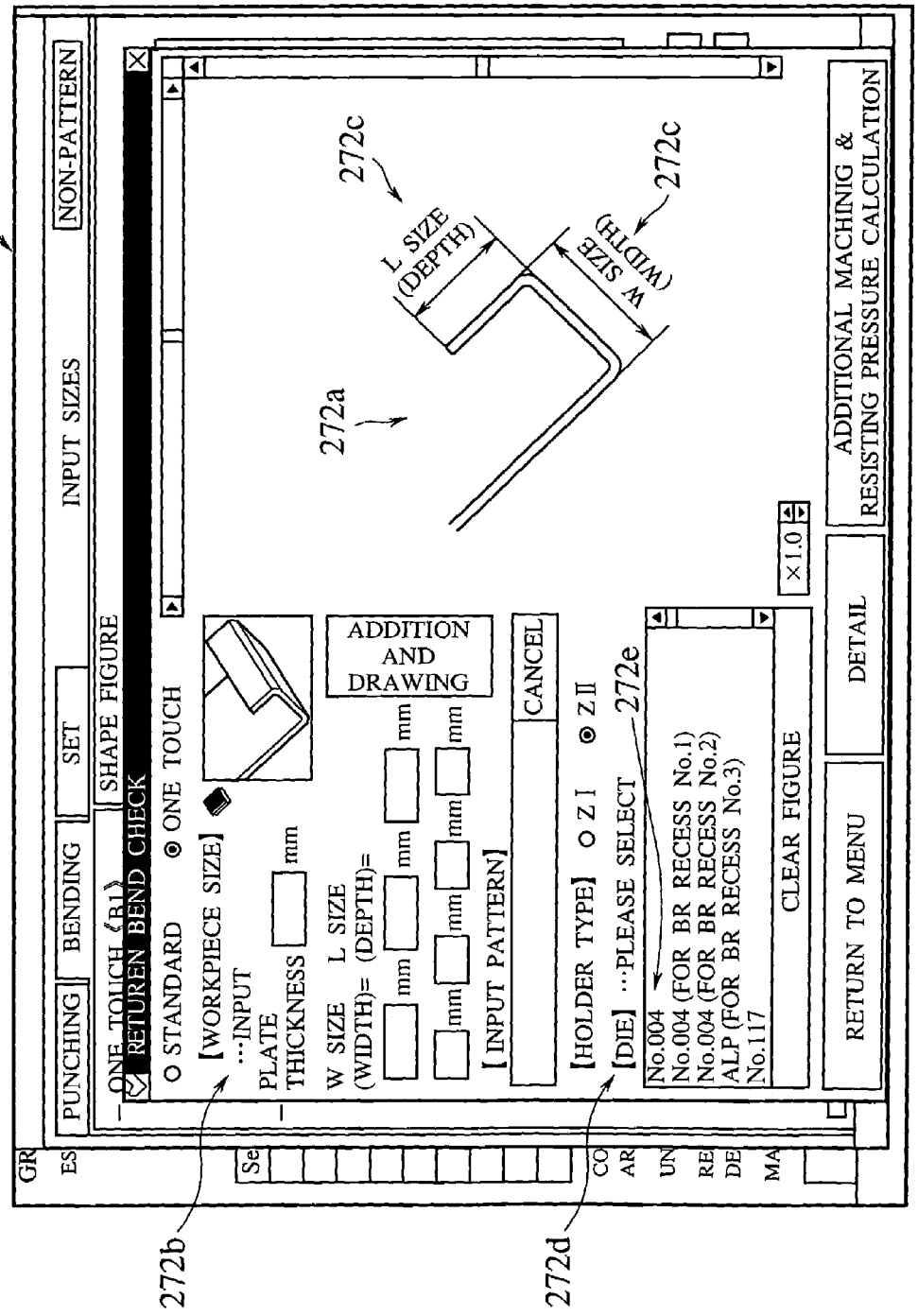
FIG. 37 is an explanatory diagram of a screen in which workpiece dimensions are input.

Then, as shown in FIG. 37, a workpiece size input screen 272 is displayed on the display apparatus. While referring to a workpiece shape 272a on a right field, desired numerals are input into a size field 272b on a left field. At this time, a size guide display 272c is displayed on the right field in an aspect accompanying the workpiece shape 272a. Accordingly, input of sizes of the workpiece can easily be performed. Thereafter, for example, a standard die 272e is selected from a die selection field 272d.

Figure 38:
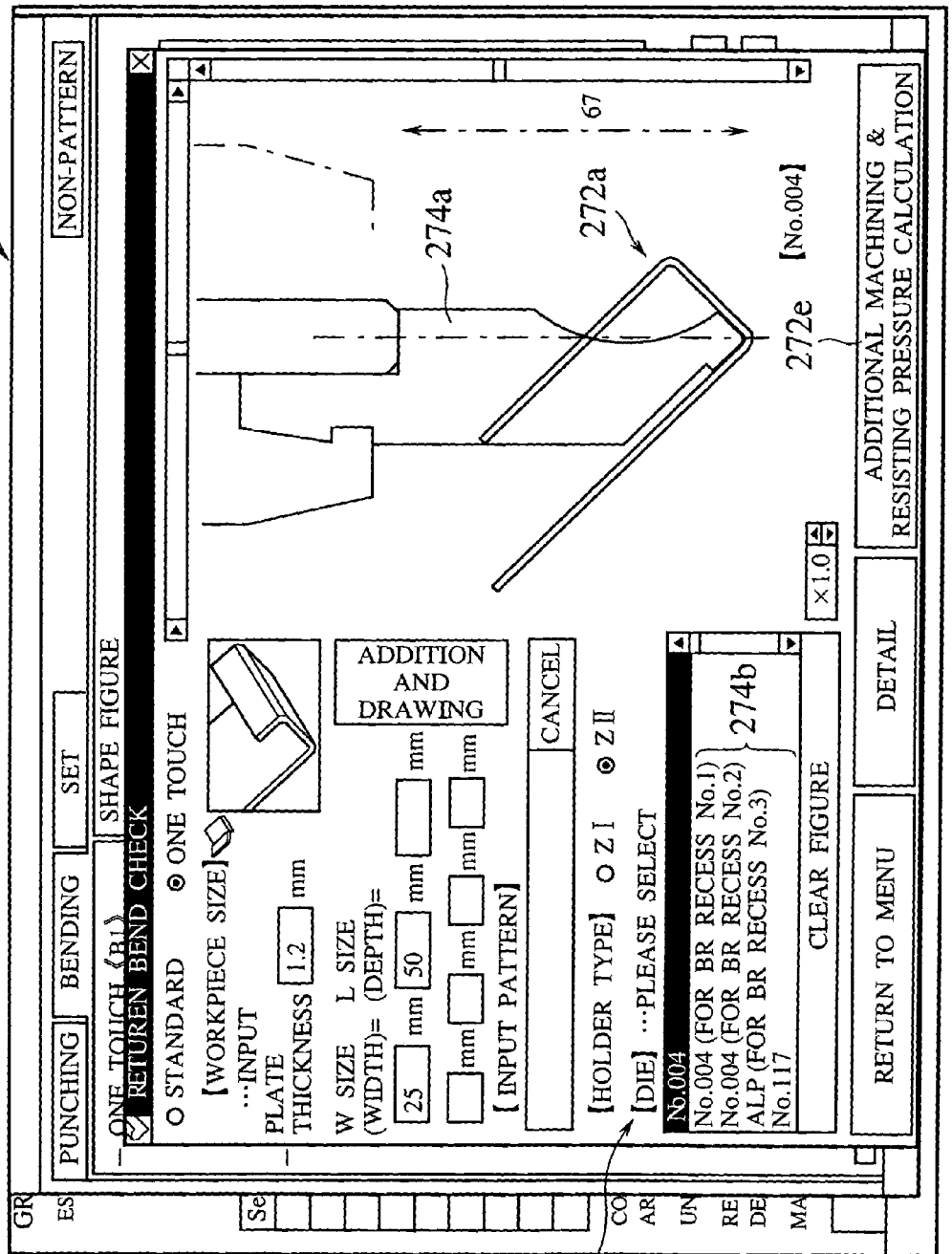
FIG. 38 is an explanatory diagram of a screen for selecting a die according to workpiece shape/workpiece dimensions.

As shown in FIG. 38, an interference state display screen 274 showing an interference state between the workpiece shape 272 and the standard die shape 274a is displayed. As shown in FIG. 38, when the standard die 274a interferes with the workpiece, another standard die 274b is selected from the die selection field 274 displayed simultaneously. Thereby, while referring to the interference between a workpiece and a selected die, an optimal die can be selected easily.

Figure 39:
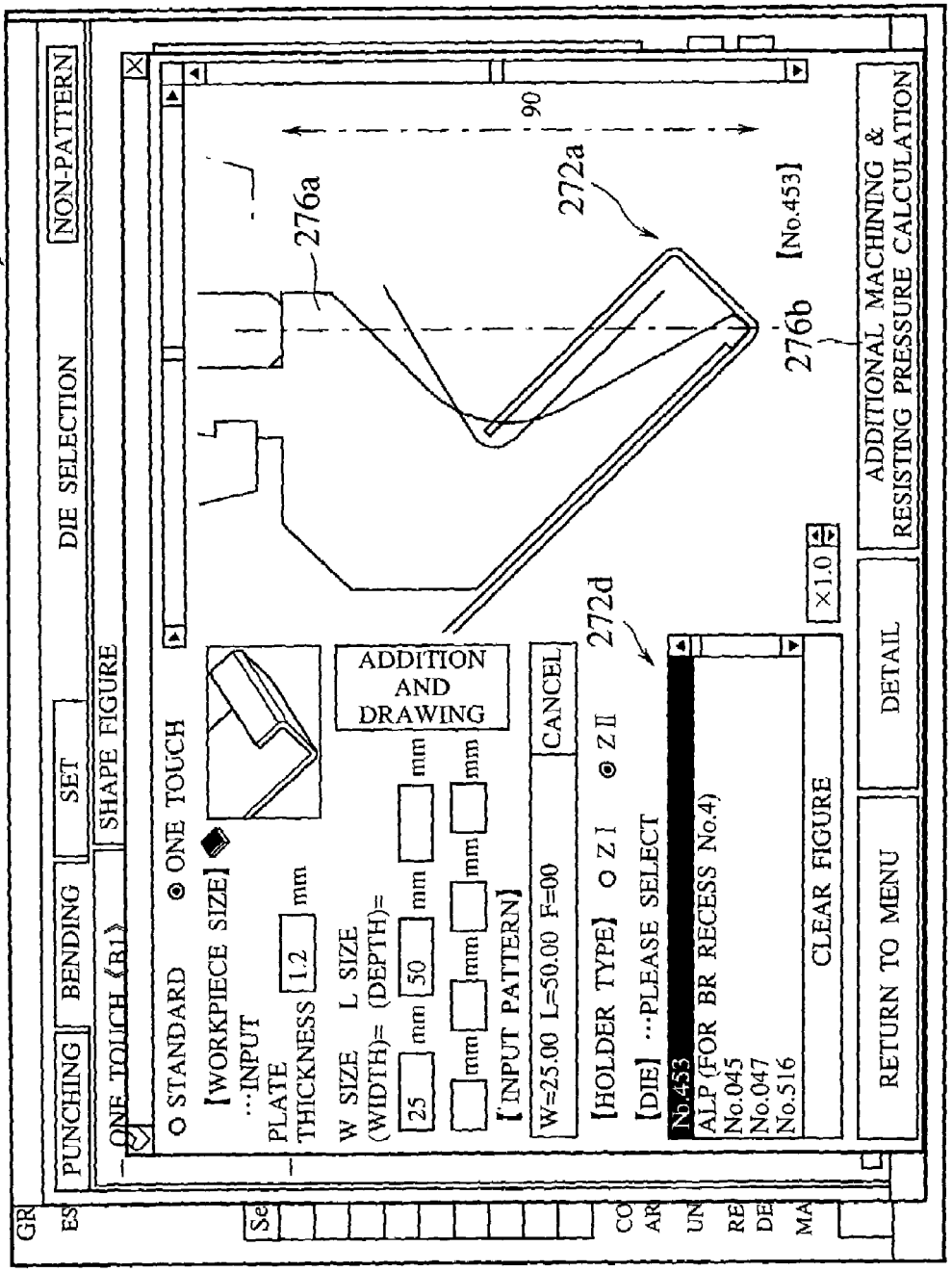
FIG. 39 is an explanatory diagram of a screen indicating additional machining to a selected die on the screen in FIG. 38.

When there is no die that does not interfere with the workpiece in standard dies included in the die selection field 272d, a die 276a which does not interfere with the workpiece so much is selected from the standard dies of the die selection field 272d and it is additionally machined (FIG. 39). In this case, as shown in FIG. 39, after the minimum interference die 276a is selected, an additional machining & resisting pressure calculation field 276b is clicked.

Figure 40:
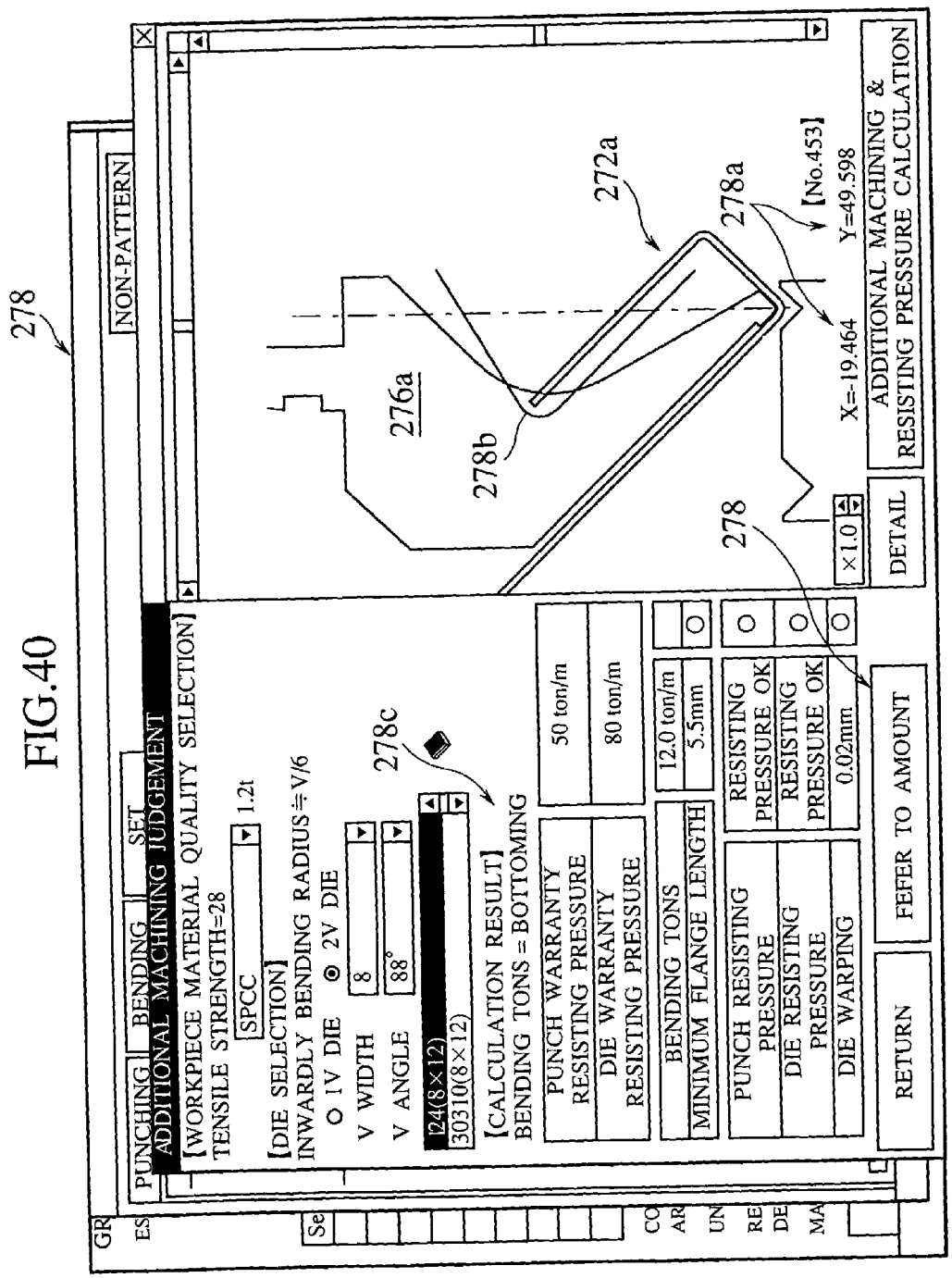
FIG. 40 is an explanatory diagram of a screen displaying resisting pressure calculation of the die which has been subjected to the additional machining specified in FIG. 39.

Thereby, as shown in FIG. 40, an additional machining specifying screen 278 is displayed. A position and an amount of additional machining are input in an additional machining specifying field 278a on this screen 278. Thereby, a locus of an additional machining is displayed on a screen displaying the die 276a and the workpiece 272a. Accordingly, according to this apparatus, the position/amount of additional machining can easily be determined while referring to the screen. When input of the position/amount of the additional machining is completed, a calculation about whether a die which has been machined additionally can be used is made simultaneously, and the calculation result is displayed on a left field 278c on the screen 278. Accordingly, a determination about possibility of the additional machining is made easily.

Figure 41:
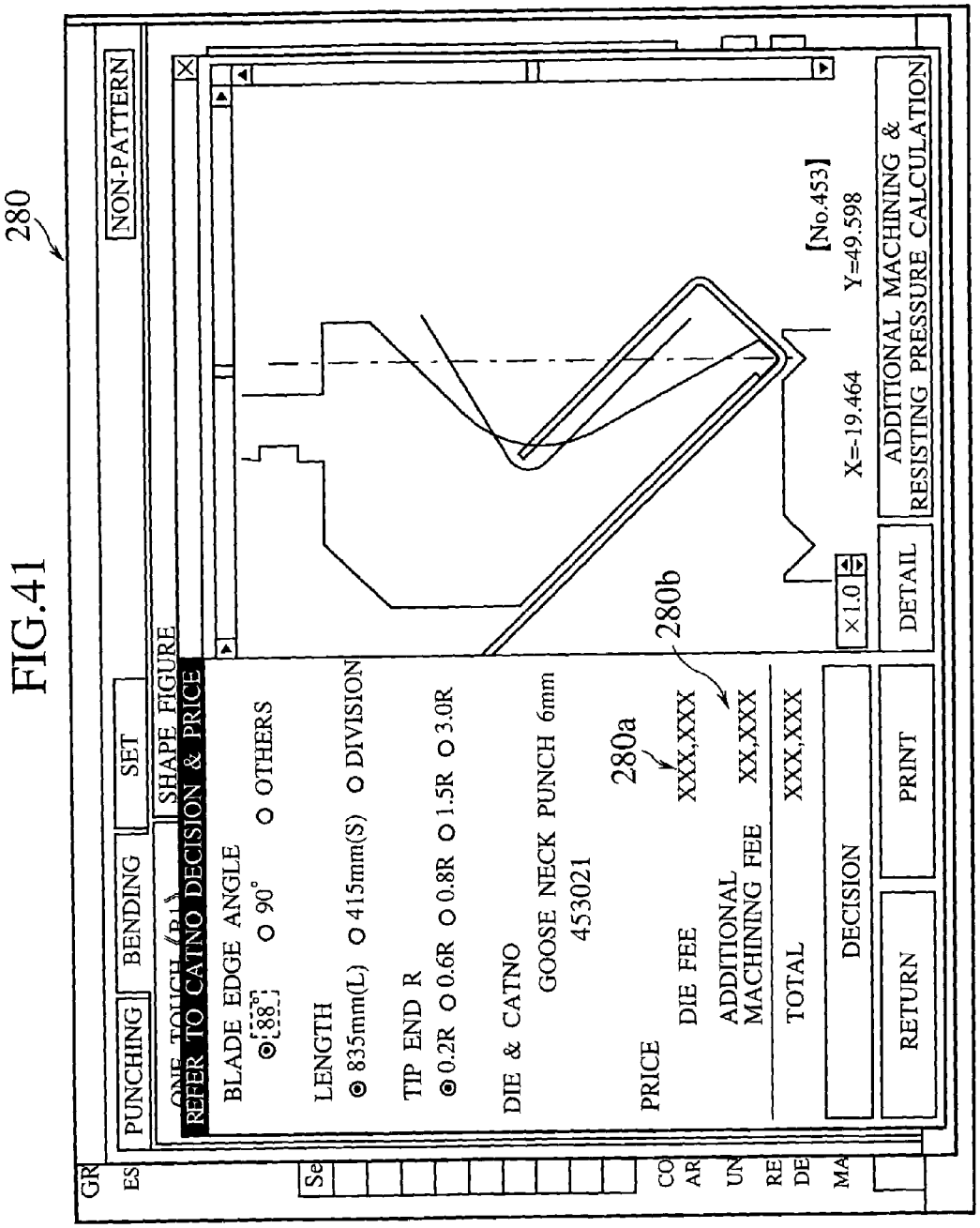
FIG. 41 is an explanatory diagram of a screen displaying a price of the die including the additional machining specified in FIG. 39.

According to the above, when the additional machining is determined to be performed and an amount reference field 278d is clicked, a price display screen 280 shown in FIG. 41 is displayed. A die price input field 280a and an additional machining price input field 280b are included on this price display screen 280. Therefore, according to this apparatus, a price of the final die including the additional machining cost can easily be confirmed.

Figure 42:
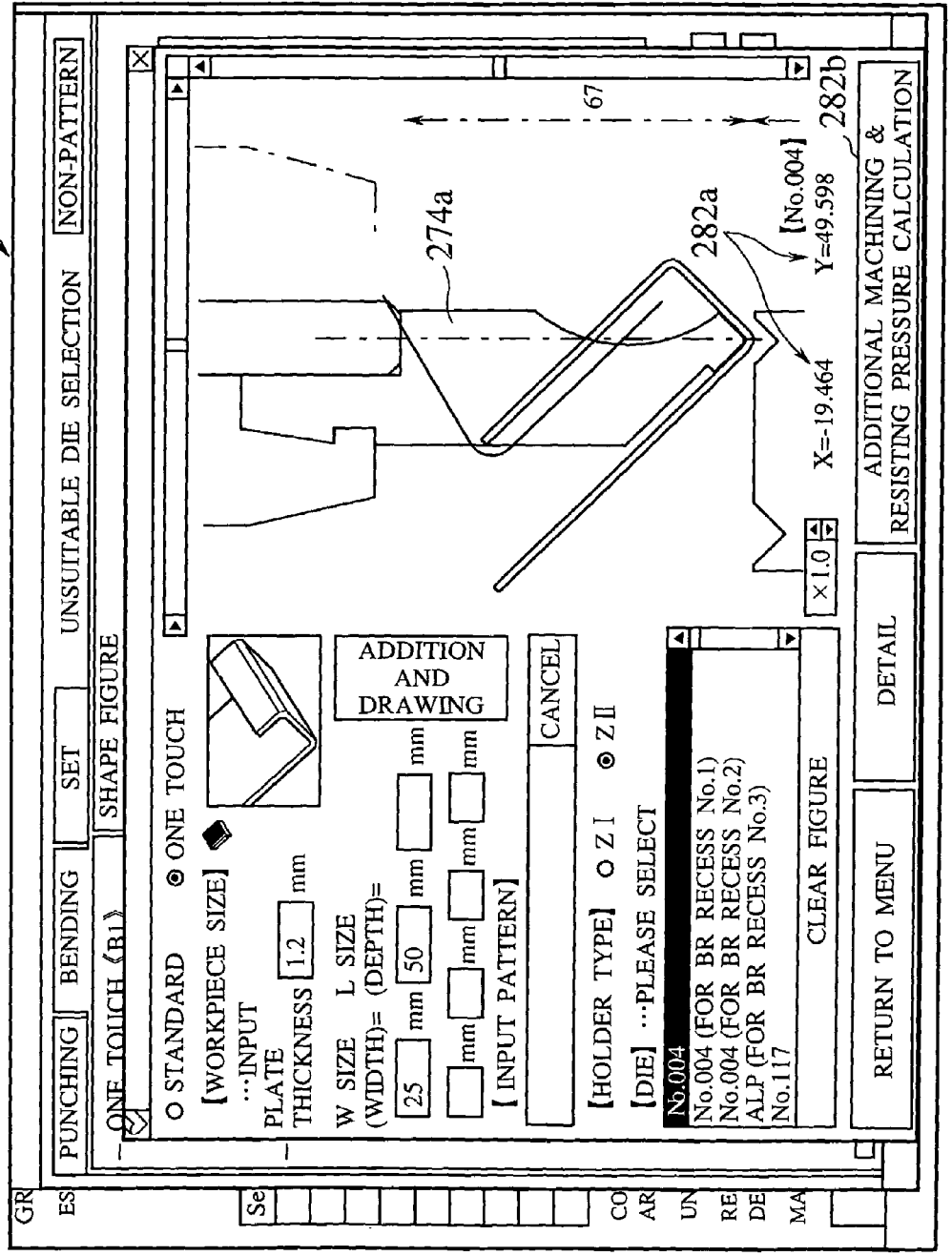
FIG. 42 is an explanatory diagram of a screen indicating anther additional machining to the selected die.
Figure 43:
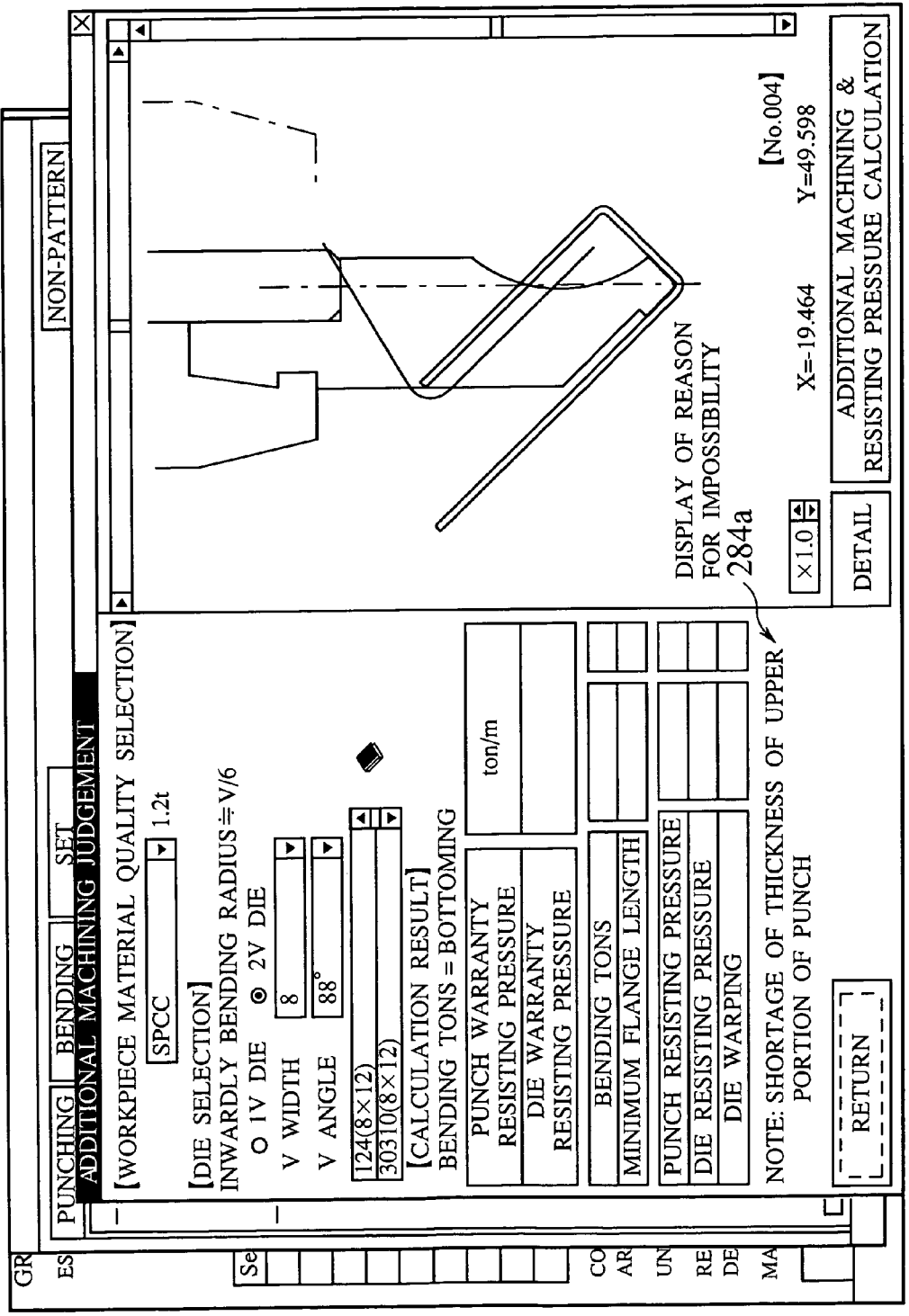
FIG. 43 is an explanatory diagram of a screen displaying resisting pressure calculation of the die which has been subjected to the additional machining specified in FIG. 42.

FIG. 42 and FIG. 43 show a case that, when the additional machining is performed on an appropriate standard die 274a, the die has been made unusable as a result.

In this case, when a proper amount of additional machining is input into an additional machining specifying field 282a of an additional machining specifying screen 282 and an additional machining performing field b is clicked, an additional machining result screen 284 shown in FIG. 43 is displayed. A reason that the die which has been subjected to additional machining is unusable is displayed in an impossible reason display field 284a on this screen 284.

Incidentally, the screens 270, 272, 274, 276, 278, 280, 282, and 284 are respectively created by respective screen creating means for creating each screen.

Incidentally, the present invention is not limited to the above embodiments, but it may be modified in various manners without departing from the scope of the present invention.

INDUSTRIAL APPLICABILITY

As explained above, according to the present invention, the following effects can be attained.

That is, functions for retrieving/displaying a product to be proposed are provided through various approaches such as increase profit calculation, a problem solving die or the like from many product groups. For this reason, efficient and various product proposal activities can be employed.

Also, the present invention provides functions for storing shape patterns and corresponding size parameters of products relating to product data to perform automatic designing/drawing checking/estimating in an interlocking manner. For this reason, it is made possible to propose an estimate about not only standard products but also special shape products instantaneously without returning back to a head office and perform early order reception/early delivery.

In this manner, using the present invention, it is made possible to improve marketing productivity in both stages of commercial article proposal and preparation " of estimate and to shorten product delivery time and reduce marketing costs.

What is claimed is:

1. A machining possibility calculator, comprising:
   a machine data input device that inputs machine data for a die to be designed, the machine data for the die including structure data, material quality data, and shape data specified by a shape pattern selected from a plurality of shape patterns and by a set of size parameters selected from a plurality of sets of size parameters corresponding to the selected shape pattern;
   a material data input apparatus that inputs material feature data including features of a material to be machined by the die; and
   a machining verifier which verifies whether the die to be designed is capable of being machined on the basis of the input machine data and material feature data.

2. A machining possibility calculating apparatus according to claim 1, wherein the features of the material to be machined include a plate thickness and the material quality of a plate material.

3. A machining possibility calculating apparatus according to claim 2, wherein the machining verifier performs the verification by comparing a resisting pressure of the die, obtained according to a strength calculation using the machine data, to a machining pressure, obtained from the material feature data, necessary for machining.

4. A machining possibility calculating apparatus according to claim 1, wherein the machining verifier performs the verification by checking consistency between the size parameters.

5. A machining possibility calculating apparatus according to claim 1, wherein, when the die to be designed is for a predetermined type of machining, the machine data includes structures and material qualities of a punch and the die, and a clearance between the punch and the die.

6. A machining possibility calculating apparatus according to claim 1, wherein, when the die to be designed is for a predetermined type of machining, the machine data further includes a tip end radius of the die, a tip end angle of the die, and a V width of the die.

* * * * *